(12) United States Patent
Kim et al.

(10) Patent No.: US 12,489,712 B2
(45) Date of Patent: Dec. 2, 2025

(54) APPARATUS AND METHOD FOR SELECTING ENTITY BASED ON DATA

(71) Applicant: SAMSUNG ELECTRONICS CO., LTD., Suwon-si (KR)

(72) Inventors: Bokkeun Kim, Suwon-si (KR); Gyeongsik Kim, Suwon-si (KR); Yongjun Park, Suwon-si (KR); Jongsun Oh, Suwon-si (KR); Heonhyung Lee, Suwon-si (KR); Jin Kim, Suwon-si (KR); Hyeongyo Jeong, Suwon-si (KR); Byounggeun Choi, Suwon-si (KR); Jaehyuk Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 63 days.

(21) Appl. No.: 18/587,588

(22) Filed: Feb. 26, 2024

(65) Prior Publication Data

US 2024/0323125 A1    Sep. 26, 2024

Related U.S. Application Data

(63) Continuation of application No. PCT/KR2024/001236, filed on Jan. 25, 2024.

(30) Foreign Application Priority Data

Mar. 24, 2023  (KR) .................. 10-2023-0038627

(51) Int. Cl.
*H04L 47/125*  (2022.01)
*H04L 43/0811*  (2022.01)
*H04L 47/127*  (2022.01)

(52) U.S. Cl.
CPC ........ *H04L 47/125* (2013.01); *H04L 43/0811* (2013.01); *H04L 47/127* (2013.01)

(58) Field of Classification Search
CPC ... H04L 47/125; H04L 43/0811; H04L 47/127
See application file for complete search history.

(56) References Cited

U.S. PATENT DOCUMENTS 10,798,178 B2  10/2020  Dodd-Noble et al.
11,425,601 B2  8/2022  Noriega
(Continued)

FOREIGN PATENT DOCUMENTS

CN   114916012 A   8/2022
CN   115802366 A   3/2023
(Continued)

OTHER PUBLICATIONS

International Search Report (PCT/ISA/210) issued on May 20, 2024 by the International Searching Authority in International Application No. PCT/KR2024/001236.
(Continued)

*Primary Examiner* — Vivek Srivastava
*Assistant Examiner* — Wuji Chen
(74) *Attorney, Agent, or Firm* — Sughrue Mion, PLLC

(57) ABSTRACT

An electronic device for a session management function (SMF) may comprise memory storing instructions and at least one processor. The instructions may cause the electronic device to: obtain a first load value for a second time interval before selecting a serving user plane function (UPF), estimated based on an artificial intelligence model (AI model) using first load information of each of UPFs measured within a first time interval before the second time interval, obtain a second load value for the second time interval, calculated by using second load information of each of the UPFs measured within the second time interval,
(Continued)

determine a difference between the first load value and the second load value, and determine, using the difference, whether to use a predicted load value of each of the UPFs obtained based on the AI model to select the serving UPF from among the UPFs.

20 Claims, 15 Drawing Sheets

(56) References Cited

U.S. PATENT DOCUMENTS

| | | | | |
|---|---|---|---|---|
| 11,477,694 | B1* | 10/2022 | Alasti | H04L 47/215 |
| 11,950,138 | B2 | 4/2024 | Bashir et al. | |
| 2021/0083956 | A1 | 3/2021 | Fan et al. | |
| 2021/0219179 | A1* | 7/2021 | Narath | H04W 76/10 |
| 2023/0040486 | A1* | 2/2023 | Xin | H04L 47/826 |
| 2023/0094746 | A1 | 3/2023 | Jeong et al. | |
| 2023/0156522 | A1* | 5/2023 | Bashir | H04L 41/147 |
| | | | | 370/329 |
| 2023/0413304 | A1 | 12/2023 | Wang et al. | |
| 2025/0126511 | A1 | 4/2025 | Starsinic et al. | |

FOREIGN PATENT DOCUMENTS

| | | | |
|---|---|---|---|
| KR | 10-2010-0045257 | A | 5/2010 |
| KR | 10-2055363 | B1 | 12/2019 |
| KR | 10-2020-0122364 | A | 10/2020 |
| KR | 10-2327021 | B1 | 11/2021 |
| KR | 10-2346648 | B1 | 1/2022 |
| KR | 10-2393322 | B1 | 4/2022 |
| KR | 10 2024 01 40943 | A | 9/2024 |

OTHER PUBLICATIONS

Written Opinion (PCT/ISA/237) issued on May 20, 2024 by the International Searching Authority in International Application No. PCT/KR2024/001236.

Madanagopal Ramachandran et al., "5G Network Management System With Machine Learning Based Analytics" IEEE Access, vol. 10, p. 73610-73622, 2022.

Grzegorz Panek et al., "Application Relocation in an Edge-Enabled 5G System: Use Cases, Architecture, and Challenges" IEEE Communications Magazine, vol. 60, Issue 8, pp. 28-34, 2022, total 8 pages.

* cited by examiner

APPARATUS AND METHOD FOR SELECTING ENTITY BASED ON DATA

CROSS-REFERENCE TO RELATED APPLICATIONS

This application is a by-pass continuation application of International Application No. PCT/KR2024/001236, filed on Jan. 25, 2024, which is based on and claims priority to Korean Patent Application No. 10-2023-0038627, filed on Mar. 24, 2023, in the Korean Intellectual Property Office, the disclosures of which are incorporated by reference herein their entireties.

BACKGROUND

1. Field

The disclosure relates to an apparatus and method for selecting an entity based on data.

2. Description of Related Art

In a communication system, a core network may include entities such as network functions (NFs). Some entities among the entities may select other entities to provide a service.

SUMMARY

In embodiments, a method performed by a first network function (NF) may comprise obtaining load information for representing a load of each NF of second NFs in a first time interval. The method may comprise identifying a first load value based on a first set of load information before a reference timing from among time intervals. The method may comprise identifying whether a difference between the first load value and a second load value that is identified based on a second set of load information after the reference timing from among the time intervals is greater than or equal to a threshold value. The method may comprise selecting a second NF from among the second NFs based on the load information in case that the difference is greater than or equal to the threshold value. The method may comprise obtaining predicted load information for representing a load of each NF of the second NFs in a second time interval after the first time interval in case that the difference is less than the threshold value. The method may comprise selecting the second NF from among the second NFs based on the load information and the predicted load information. The predicted load information may be obtained by using an artificial intelligence model (AI model) based on the load information.

In embodiments, a device of first network function (NF) may comprise a transceiver. The device may comprise a processor operatively coupled to the transceiver. The processor may be configured to obtain load information for representing a load of each NF of second NFs in a first time interval. The processor may be configured to identify a first load value based on a first set of load information before a reference timing from among time intervals. The processor may be configured to identify whether a difference between the first load value and a second load value that is identified based on a second set of load information after the reference timing from among the time intervals is greater than or equal to a threshold value. The processor may be configured to select a second NF from among the second NFs based on the load information in case that the difference is greater than or equal to the threshold value. The processor may be configured to obtain predicted load information for representing a load of each NF of the second NFs in a second time interval after the first time interval in case that the difference is less than the threshold value. The processor may be configured to select the second NF from among the second NFs based on the load information and the predicted load information. The predicted load information may be obtained by using an artificial intelligence model (AI model) based on the load information.

In embodiments, a method performed by a network data analytics function (NWDAF) may comprise receiving, from a first network function (NF), a request message for selection a second NF from among second NFs. The method may comprise obtaining load information for representing a load of each NF of the second NFs in a first time interval. The method may comprise identifying a first load value based on a first set of load information before a reference timing from among time intervals. The method may comprise identifying whether a difference between the first load value and a second load value that is identified based on a second set of load information after the reference timing from among the time intervals is greater than or equal to a threshold value. The method may comprise generating a response message including the load information in case that the difference is greater than or equal to the threshold value. The method may comprise generating the response message including the load information and predicted load information for representing a load of each NF of the second NFs in a second time interval after the first time interval in case that the difference is less than the threshold value. The method may comprise transmitting, to the first NF, the response message. The predicted load information may be obtained by using an artificial intelligence model (AI model) based on the load information.

In embodiments, an electronic device for a session management function (SMF) may comprise memory storing instructions. The electronic device may comprise at least one processor. The instructions may cause, when executed by the at least one processor, the electronic device to obtain a first load for a second time interval before selecting a serving user plane function (UPF), predicated based on a machine learning using first load information of each of UPFs within a first time interval before the second time interval. The instructions may cause, when executed by the at least one processor, the electronic device to obtain a second load for the second time interval, measured by using second load information of each of the UPFs within the second time interval. The instructions may cause, when executed by the at least one processor, the electronic device to determine a difference between the first load for the second time interval and the second load for the second time interval. The instructions may cause, when executed by the at least one processor, the electronic device to determine, using the difference, whether to obtain a predicted load of each of the UPFs based on the machine learning to select the serving UPF from among the UPFs.

In embodiments, a method performed by an electronic device for a session management function (SMF) may comprise obtaining a first load for a second time interval before selecting a serving user plane function (UPF), predicated based on a machine learning using first load information of each of UPFs within a first time interval before the second time interval. The method may comprise obtaining a second load for the second time interval, measured by using second load information of each of the UPFs within the second time interval. The method may comprise determining a difference between the first load for the second time interval and the second load for the second time interval. The method may comprise determining, using the difference, whether to obtain a predicted load of each of the UPFs based on the machine learning to select the serving UPF from among the UPFs.

In embodiments, a computer-readable storage medium may include instructions. The instructions may cause, when executed by at least one processor of an electronic device for a session management function (SMF), the electronic device to obtain a first load for a second time interval before selecting a serving user plane function (UPF), predicated based on a machine learning using first load information of each of UPFs within a first time interval before the second time interval. The instructions may cause, when executed by the at least one processor, the electronic device to obtain a second load for the second time interval, measured by using second load information of each of the UPFs within the second time interval. The instructions may cause, when executed by the at least one processor, the electronic device to determine a difference between the first load for the second time interval and the second load for the second time interval. The instructions may cause, when executed by the at least one processor, the electronic device to determine, using the difference, whether to obtain a predicted load of each of the UPFs based on the machine learning to select the serving UPF from among the UPFs.

In embodiments, an electronic device for a session management function (SMF) may comprise memory storing instructions. The electronic device may comprise at least one processor. The instructions may cause, when executed by the at least one processor, the electronic device to obtain a first load value for a second time interval before selecting a serving user plane function (UPF), estimated based on an artificial intelligence model (AI model) using first load information of each of UPFs measured within a first time interval before the second time interval. The instructions may cause, when executed by the at least one processor, the electronic device to obtain a second load value for the second time interval, calculated by using second load information of each of the UPFs measured within the second time interval. The instructions may cause, when executed by the at least one processor, the electronic device to determine a difference between the first load value for the second time interval and the second load value for the second time interval. The instructions may cause, when executed by the at least one processor, the electronic device to determine, using the difference, whether to use a predicted load value of each of the UPFs obtained based on the AI model to select the serving UPF from among the UPFs.

In embodiments, a method performed by an electronic device for a session management function (SMF), may comprise obtaining a first load value for a second time interval before selecting a serving UPF, estimated based on an artificial intelligence model (AI model) using first load value information of each of UPFs measured within a first time interval before the second time interval. The method may comprise obtaining a second load value for the second time interval, calculated by using second load value information of each of the UPFs measured within the second time interval. The method may comprise determining a difference between the first load value for the second time interval and the second load value for the second time interval. The method may comprise determining, using the difference, whether to use a predicted load value of each of the UPFs obtained based on the AI model to select the serving UPF from among the UPFs.

In embodiments, a computer-readable storage medium may include instructions. The instructions may cause, when executed by at least one processor of an electronic device for a session management function (SMF), the electronic device to obtain a first load value for a second time interval before selecting a serving UPF, predicated based on an artificial intelligence model (AI model) using first load value information of each of UPFs measured within a first time interval before the second time interval. The instructions may cause, when executed by the at least one processor, the electronic device to obtain a second load value for the second time interval, calculated by using second load value information of each of the UPFs measured within the second time interval. The instructions may cause, when executed by the at least one processor, the electronic device to determine a difference between the first load value for the second time interval and the second load value for the second time interval. The instructions may cause, when executed by the at least one processor, the electronic device to determine, using the difference, whether to use a predicated load value of each of the UPFs obtained based on the AI model to select the serving UPF from among the UPFs.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
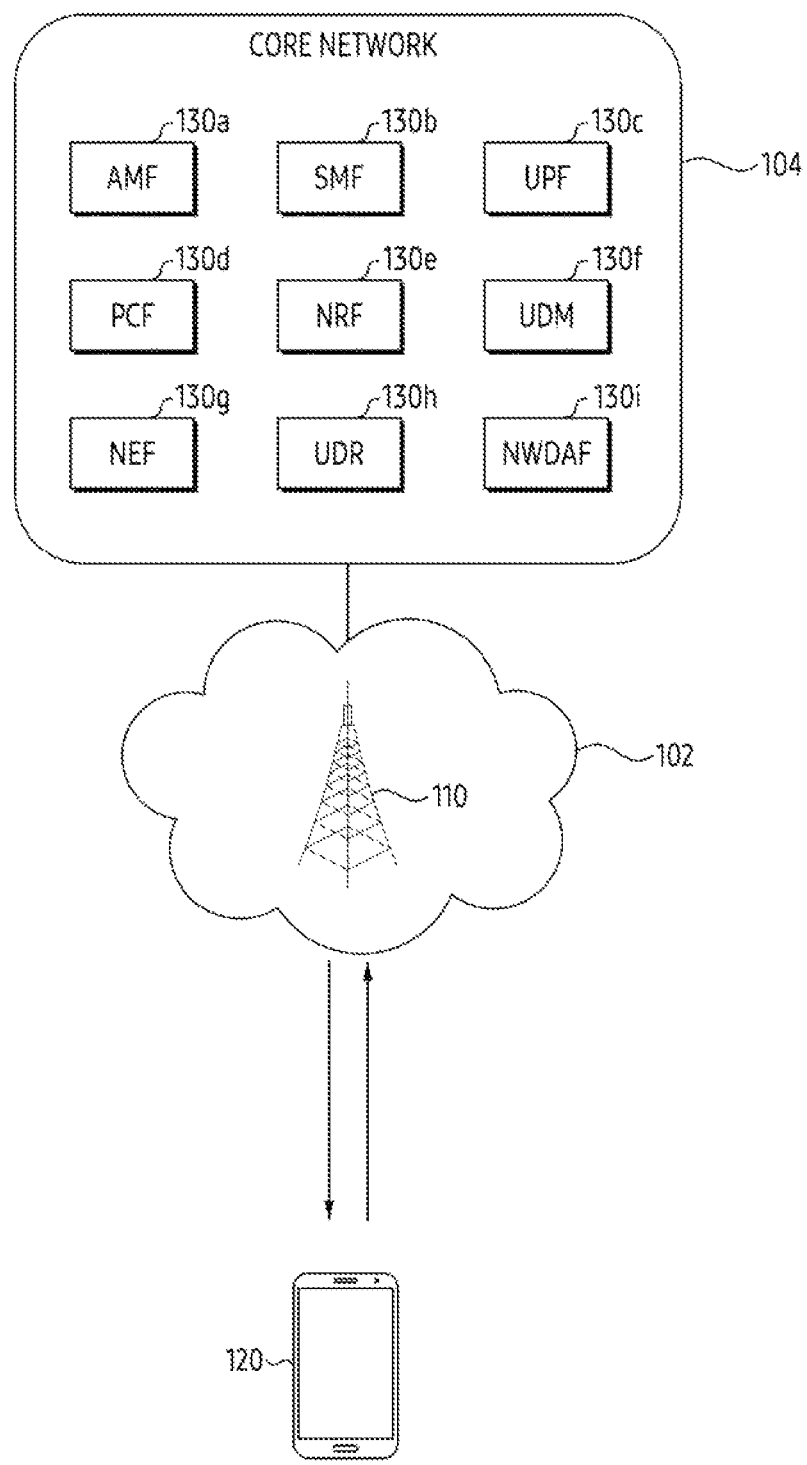
FIG. 1 illustrates an example of a communication system.

Terms used in the disclosure are used only to describe a specific embodiment, and may not be intended to limit the scope of another embodiment. A singular expression may include a plural expression unless it is clearly meant differently in the context. The terms used herein, including a technical or scientific term, may have the same meaning as generally understood by a person having ordinary knowledge in the technical field described in the disclosure. Terms defined in a general dictionary among the terms used in the disclosure may be interpreted with the same or similar meaning as a contextual meaning of related technology, and unless clearly defined in the disclosure, it is not interpreted in an ideal or excessively formal meaning. In some cases, even terms defined in the disclosure cannot be interpreted to exclude embodiments of the disclosure.

In one or more embodiments of the disclosure described below, a hardware approach is described as an example. However, since the one or more embodiments of the disclosure include technology that use both hardware and software, the one or more embodiments of the disclosure do not exclude a software-based approach.

A term referring to a signal (e.g., signal, information, message, signaling, data), a term for the operational state (e.g., step, operation, procedure), a term referring to data (e.g., packet, user stream, information, bit, symbol, codeword), a term referring to a component of a device, and the like used in the following description are exemplified. The disclosure is not limited to terms described below, and another term having an equivalent technical meaning may be used.

In addition, in the disclosure, in order to determine whether a specific condition is satisfied or fulfilled, an expression of more than or less than may be used, but this is only a description for expressing an example, and does not exclude description of more than or equal to or less than or equal to. A condition described as 'more than or equal to' may be replaced with 'more than', a condition described as 'less than or equal to' may be replaced with 'less than', and a condition described as 'more than or equal to and less than' may be replaced with 'more than and less than or equal to'.

The term "couple" and the derivatives thereof refer to any direct or indirect communication between two or more elements, whether or not those elements are in physical contact with each other. The terms "transmit", "receive", and "communicate" as well as the derivatives thereof encompass both direct and indirect communication. The terms "include" and "comprise", and the derivatives thereof refer to inclusion without limitation. The term "or" is an inclusive term meaning "and/or". The phrase "associated with," as well as derivatives thereof, refer to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" refers to any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of A, B, and C" includes any of the following combinations: A, B, C, A and B, A and C, B and C, and A and B and C, and any variations thereof. The expression "at least one of a, b, or c" may indicate only a, only b, only c, both a and b, both a and c, both b and c, all of a, b, and c, or variations thereof.

Similarly, the term "set" means one or more. Accordingly, the set of items may be a single item or a collection of two or more items.

Moreover, multiple functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as Read Only Memory (ROM), Random Access Memory (RAM), a hard disk drive, a Compact Disc (CD), a Digital Video Disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

The disclosure describes embodiments by using terms used in some communication standards (e.g., 3rd Generation Partnership Project (3GPP)), but this is only an example for description. Embodiments of the disclosure may also be applied to other communication and broadcasting systems.

FIG. 1 illustrates an example of a communication system.

Referring to FIG. 1, the communication system may include a radio access network (RAN) 102 and a core network (CN) 104.

The radio access network 102, which is a network directly connected to a terminal 120, is an infrastructure that provides wireless access to the terminal 120. The radio access network 102 may include a set of a plurality of base stations including a base station 110, and the plurality of base stations may communicate through an interface formed with each other. At least a part of the interfaces between the plurality of base stations may be wired or wireless.

The base station 110 may have a structure separated into a central unit (CU) and a distributed unit (DU). In this case, a single CU may control a plurality of DUs. In addition to a base station, the base station 110 may be referred to as 'access point (AP)', 'next generation node B (gNB)', '5$^{th}$ generation node (5G node)', 'wireless point', 'transmission/reception point (TRP)', or another term with equivalent technical meaning. The terminal 120 connects to the radio access network 102 and communicates with the base station 110 through a wireless channel. In addition to a terminal, the terminal 120 may be referred to as 'user equipment (UE)', 'mobile station', 'subscriber station', 'remote terminal', 'wireless terminal', 'user device', or o another term with equivalent technical meaning.

The core network 104, which is a network that manages the entire system, may control the radio access network 102 and process data and control signals for the terminal 120 transmitted/received through the radio access network 102. The core network 104 may perform various functions such as control of a user plane and a control plane, processing of mobility, management of subscriber information, billing, and interworking with another type of system (e.g., long term evolution (LTE) system).

In order to perform various functions described above, the core network 104 may include a plurality of functionally separated entities with different network functions (NFs). The entity may be referred to as an NF or a node. For example, the core network 104 may include an access and mobility management function (AMF) 130*a*, a session management function (SMF) 130*b*, a user plane function (UPF) 130*c*, a policy and charging function (PCF) 130*d*, a network repository function (NRF) 130*e*, a user data management (UDM) 130*f*, a network exposure function (NEF) 130*g*, a unified data repository (UDR) 130*h*, and a network data analytics function (NWDAF) 130*i*. However, the embodiment of the disclosure is not limited thereto. For example, the core network 104 may further include other NFs, and may include less of at least one of the NFs illustrated in FIG. 1.

For example, each of the entities in the core network 104 of FIG. 1 is illustrated as entities that exist independently, but the embodiment of the disclosure is not limited thereto. For example, a specific NF may be included in another NF. For example, the SMF 130*b* may include the NWDAF 130*i*. The NWDAF 130*i* included in the SMF 130*b* may be configured with hardware, software, or hardware and software, which perform a function of the NWDAF 130*i*.

The terminal 120 may access the AMF 130*a* that performs a mobility management function of the core network 104 by being connected to the radio access network 102. The AMF 130*a* may perform access to the radio access network 102 and a mobility management of the terminal 120. The SMF 130*b* may manage a session. The AMF 130*a* may be connected to the SMF 130*b* and route a session-related message for the terminal 120 to the SMF 130*b*. The SMF 130*b* may allocate a user plane resource to be provided to the terminal 120 by connecting to the UPF 130*c* and establish a tunnel for transmitting data between the base station 110 and the UPF 130*c*. The PCF 130*d* may control a policy for a session used by the terminal 120 and information related to charging. The NRF 130*e* may store information on NFs installed in a mobile communication service operator network and perform a function of notifying the stored information. The NRF 130*e* may be connected to all NFs. Each NF may notify the NRF 130*e* that the corresponding NF is operating in the network, by registering with the NRF 130*e* when starting operation on the operator network. The UDM 130*f*, which is an NF playing a similar role to a home subscriber server (HSS) of a 4G network, may store subscription information of the terminal 120 or context used in the network by the terminal 120. The NEF 130*g* may serve to connect an NF within a 5G mobile communication system with a $3^{rd}$ party server. For example, the $3^{rd}$ party server (or a $3^{rd}$ party application) may be an application function (AF). In addition, the NEF 130*g* may provide data to the UDR 130*h*, update, or obtain data. The UDR 130*h* may perform functions of storing subscription information of the terminal 120, storing policy information, storing data exposed to outside, or storing information necessary for the $3^{rd}$ party application. In addition, the UDR 130*h* may also serve to provide stored data to another NF. The NWDAF 130*i* may provide a function of collecting and analyzing network data. For example, the NWDAF 130*i* may obtain data from another NF and perform inference through analysis or training based on the obtained data.

Figure 2A:
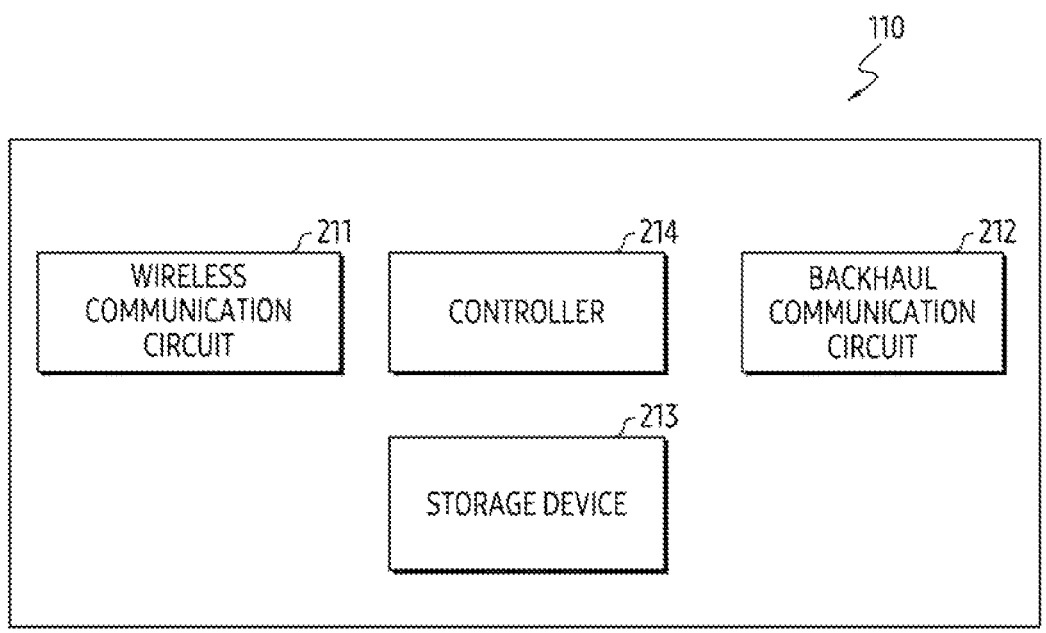
FIG. 2A illustrates a functional configuration of a base station in a communication system.

FIG. 2A illustrates a functional configuration of a base station in a communication system.

The configuration illustrated in FIG. 2A may be understood as a configuration of the base station 110. Terms such as ' . . . unit' and ' . . . er' used below refer to a unit that processes at least one function or operation, which may be implemented as hardware, software, or a combination of hardware and software.

Referring to FIG. 2A, the base station 110 may include a wireless communication circuit 211, a backhaul communication circuit 212, a storage device 213, and a controller 214.

The wireless communication circuit 211 performs functions for transmitting and receiving a signal through a wireless channel. For example, the wireless communication circuit 211 performs a conversion function between a baseband signal and bit string according to a physical layer standard of a system. For example, when transmitting data, the wireless communication circuit 211 generates complex symbols by encoding and modulating a transmission bit string. In addition, when receiving data, the wireless communication circuit 211 restores a reception bit string by demodulating and decoding a baseband signal.

In addition, the wireless communication circuit 211 up-converts a baseband signal into a radio frequency (RF) band signal, transmits it through an antenna, and down-converts an RF band signal received through the antenna into a baseband signal. To this end, the wireless communication circuit 211 may include a transmission filter, a reception filter, an amplifier, a mixer, an oscillator, a digital to analog convertor (DAC), an analog to digital convertor (ADC), and the like. In addition, the wireless communication circuit 211 may include a plurality of transmission/reception paths. Furthermore, the wireless communication circuit 211 may include at least one antenna array configured with a plurality of antenna elements.

In terms of hardware, the wireless communication circuit 211 may be configured with a digital part and an analog part. The analog part may be configured with a plurality of sub-parts according to an operating power, an operating frequency, and the like. The digital part may be implemented with at least one processor (e.g., a digital signal processor (DSP)).

The wireless communication circuit 211 transmits and receives a signal as described above. Accordingly, all or part of the wireless communication circuit 211 may be referred to as 'transmitter', 'receiver', or 'transceiver'. In addition, in the following description, transmission and reception performed through a wireless channel includes meaning that processing as described above by the wireless communication circuit 211 is performed.

The backhaul communication circuit 212 provides an interface for communicating with other nodes in the network. In other words, the backhaul communication circuit 212 converts a bit string transmitted from the base station 110 to another node, for example, another access node, another base station, higher node, core network, and the like, into a physical signal, and converts the physical signal received from another node into a bit string, and converts a physical signal received from another node into a bit string.

The storage device 213 stores data such as a basic program, an application program, and setting information for an operation of the base station 110. The storage device 213 may be configured as a volatile memory, a nonvolatile memory, or a combination of the volatile memory and the nonvolatile memory. In addition, the storage device 213 provides stored data according to a request of the controller 214.

The controller 214 controls overall operations of the base station 110. For example, the controller 214 transmits and receives a signal through the wireless communication circuit 211 or the backhaul communication circuit 212. In addition, the controller 214 records and reads data in the storage device 213. In addition, the controller 214 may perform functions of protocol stack required by the communication standard. According to another implementation example, the protocol stack may be included in the wireless communication circuit 211. To this end, the controller 214 may include at least one processor. According to one or more embodiments, the controller 214 may control the base station 110 to perform synchronization using a wireless communication network. For example, the controller 214 may control the base station 110 to perform operations according to one or more embodiments described below.

Figure 2B:
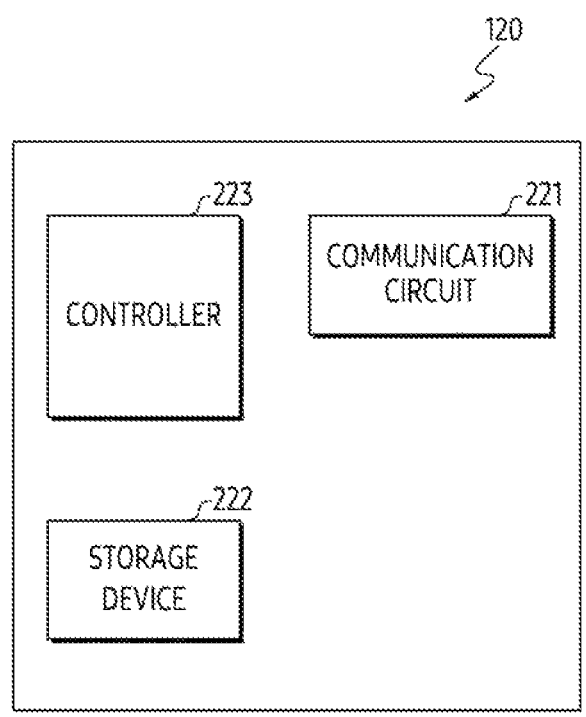
FIG. 2B illustrates a functional configuration of a terminal in a communication system.

FIG. 2B illustrates a functional configuration of a terminal in a communication system.

The configuration illustrated in FIG. 2B may be understood as a configuration of the terminal 120. Terms such as ' . . . unit' and ' . . . er' used below refer to a unit that processes at least one function or operation, which may be implemented as hardware, software, or a combination of hardware and software.

Referring to FIG. 2B, a terminal 120 may include a communication circuit 221, a storage device 222, and a controller 223.

The communication circuit 221 of the terminal 120 performs functions for transmitting and receiving a signal through a wireless channel. For example, the communication circuit 221 performs a conversion function between a baseband signal and bit string according to a physical layer standard of a system. For example, when transmitting data, the communication circuit 221 generates complex symbols by encoding and modulating a transmission bit string. In addition, when receiving data, the communication circuit 221 restores a reception bit string by demodulating and decoding a baseband signal. In addition, the communication circuit 221 up-converts a baseband signal into a radio frequency (RF) band signal, transmits it through an antenna, and down-converts an RF band signal received through the antenna into a baseband signal. For example, the communication circuit 221 may include a transmission filter, a reception filter, an amplifier, a mixer, an oscillator, a DAC, an ADC, and the like.

In addition, the communication circuit 221 may include a plurality of transmission/reception paths. Furthermore, the communication circuit 221 may include at least one antenna array configured with a plurality of antenna elements. In terms of hardware, the communication circuit 221 may be configured with a digital circuit and an analog circuit (e.g., a radio frequency integrated circuits (RFIC)). Herein, the digital circuit and the analog circuit may be implemented as one package. In addition, the communication circuit 221 may include a plurality of RF chains. Furthermore, the communication circuit 221 may perform beamforming.

The communication circuit 221 transmits and receives a signal as described above. Accordingly, all or part of the communication circuit 221 may be referred to as 'transmitter', 'receiver', or 'transceiver'. In addition, in the following description, transmission and reception performed through a wireless channel includes meaning that processing as described above by the communication circuit 221 is performed.

The storage device 222 stores data such as a basic program, an application program, and setting information for an operation of the terminal 120. The storage device 222 may be configured as a volatile memory, a nonvolatile memory, or a combination of the volatile memory and the nonvolatile memory. In addition, the storage device 222 provides stored data according to a request of the controller 223.

The controller 223 controls overall operations of the terminal 120. For example, the controller 223 transmits and receives a signal through the communication circuit 221. In addition, the controller 223 records and reads data in the storage device 222. In addition, the controller 223 may perform functions of protocol stack required by the communication standard. To this end, the controller 223 may include at least one processor or micro-processor, or may be a part of a processor. In addition, the controller 233 and a part of the communication circuit 221 may be referred to as a communication processor (CP). According to one or more embodiments, the controller 223 may control the terminal 120 to perform synchronization using a wireless communication network. For example, the controller 223 may control the terminal 120 to perform operations according to one or more embodiments described below.

Figure 2C:
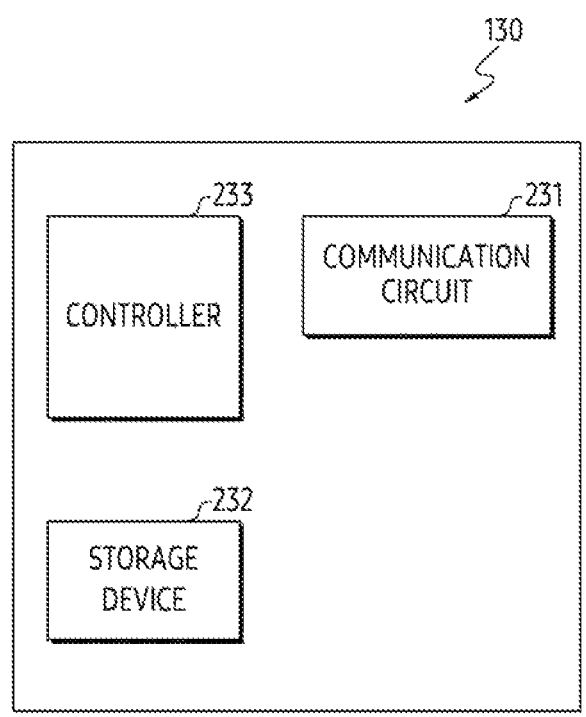
FIG. 2C illustrates a functional configuration of a core network entity in a communication system.

FIG. 2C illustrates a functional configuration of a core network entity in a communication system.

A core network entity 130 illustrated in FIG. 2C may be understood as a configuration of a device with at least one function from among the AMF 130a, the SMF 130b, the UPF 130c, the PCF 130d, the NRF 130e, the UDM 130f, the NEF 130g, the UDR 130h, or the NWDAF 130i in FIG. 1. However, the embodiment of the disclosure is not limited thereto. For example, the core network entity 130 of FIG. 2C may be understood as an example of a functional configuration for an entity different from the above-described example. The entity may be referred to as a node or a network function (NF). Terms such as ' . . . unit' and ' . . . er' used below refer to a unit that processes at least one function or operation, which may be implemented as hardware, software, or a combination of hardware and software.

Referring to FIG. 2C, the core network entity 130 may include a communication circuit 231, a storage device 232, and a controller 233.

The communication circuit 231 of the core network entity 130 provides an interface for performing communication with other devices in the network. In other words, the communication circuit 231 converts a bit string transmitted from the core network entity 130 to another device into a physical signal and converts a physical signal received from another device into a bit string. In other words, the communication circuit 231 may transmit and receive a signal. Accordingly, the communication circuit 231 may be referred to as a modem, a transmitter, a receiver, or a transceiver. At this time, the communication circuit 231 allows the core network entity 130 to communicate with other devices or system through a backhaul connection (e.g., wired backhaul or wireless backhaul) or a network.

The storage device 232 stores data such as a basic program, an application program, and setting information for an operation of the core network entity 130. The storage device 232 may be configured as a volatile memory, a nonvolatile memory, or a combination of the volatile memory and the nonvolatile memory. In addition, the storage device 232 provides stored data according to a request of the controller 233.

The controller 233 controls overall operations of the core network entity 130. For example, the controller 233 transmits and receives a signal through the communication circuit 231. In addition, the controller 233 records and reads data in the storage device 232. To this end, the controller 233 may include at least one processor. According to one or more embodiments, the controller 233 may control the core network entity 130 to perform synchronization using a wireless communication network. For example, the controller 233 may control the core network entity 130 to perform operations according to one or more embodiments described below.

Figure 3:
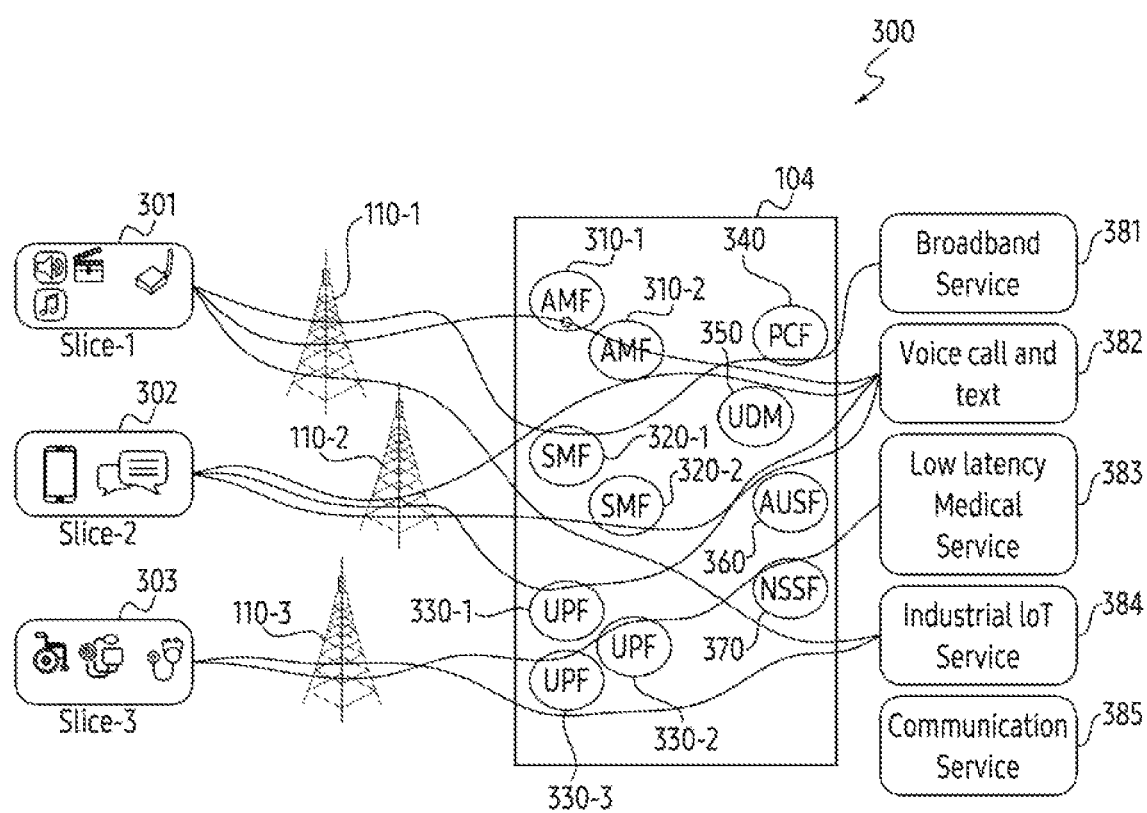
FIG. 3 illustrates an example of network function (NF) selection in a communication system.

FIG. 3 illustrates an example of network function (NF) selection in a communication system.

A communication system 300 of FIG. 3 may represent an example of the communication system of FIG. 1. For example, the communication system 300 may include base stations 110-1, 110-2, and 110-3 and a core network 104. FIG. 3 illustrates an example of a 5th generation (5G) communication system, but the embodiment of the disclosure is not limited thereto. For example, the communication system 300 of FIG. 3 may include a long term evolution (LTE) communication system as well as a 5G communication system.

Referring to FIG. 3, the communication system 300 may include the base stations 110-1, 110-2, and 110-3 and the core network 104. The core network 104 may include NFs. For example, the core network 104 may include AMFs 310-1 and 310-2, SMFs 320-1 and 320-2, UPFs 330-1, 330-2, and 330-3, a PCF 340, a UDM 350, an authentication server function (AUSF) 360, and a network slicing selection function (NSSF) 370. However, the embodiments of the disclosure are not limited thereto. For example, the core network 104 may further include other NFs other than NFs exemplified in FIG. 3, or may less include at least some of the NFs exemplified in FIG. 3. The PCF 340 may correspond to the PCF 130d in FIG. 1. The UDM 350 may correspond to the UDM 130f in FIG. 1.

Network slicing is a technology that logically configures a virtualized network and separates it into network slices (or slices). One terminal (e.g., a terminal 120 of FIG. 1) may access two or more slices in case of receiving various services. The network slice may represent each separated configuration by virtualizing physical network resources to support a specific service. Network slicing technology was introduced to support various services in a virtualized network structure. Network slicing may represent a set of NFs for supporting the specific service. Referring to FIG. 3, the communication system 300 may provide various services 381, 382, 383, 384, and 385 based on the base stations 110-1, 110-2, and 110-3 and NFs of the core network 104 associated with network slices 301, 302, and 303. The number of nodes (e.g., base stations, NFs), slices, and services included in the communication system 300 of FIG. 3 is exemplary, and the embodiment of the disclosure is not limited thereto.

As described above, the core network 104 (e.g., 5G core (5GC) or evolved packet core (EPC)) of the communication system (e.g., 5G communication system or LTE communication system) may include NFs. Some NFs among the NFs may select other NFs to be connected to by considering location information, service, or capacity. Some of the NFs may be referred to as consumer NFs, and the other NFs may be referred to as provider NFs. In the configuration of the core network 104, an efficient NF selection method is required.

The NF selection may be performed based on a service-related parameter including data network name (DNN) and single network slice selection assistance information (S-NSSAI), a location parameter including a tracking area (TA) and a TA list, and a capacity parameter. For example, the NF selection may identify the NFs based on the DNN, the S-NSSAI, and the location parameter, and may select a specific NF based on capacity information among the identified NFs. The NFs may be referred to as an NF group. The NF group may represent a set of NFs capable of providing the same service. Selecting the specific NF among the NFs may include distributing by using a round-robin (RR) method through a fixed ratio based on a capacity value within the NFs. The capacity value may be set in proportion to the capacity of NF, and load balancing may be performed based on the set capacity value.

As described above, the method of selecting the NF through the fixed ratio can be applied to a relatively simply configured network structure. However, like the communication system 300 exemplified in FIG. 3, the network structure is becoming more complex as various and segmented NFs are operated to provide various services. In the NF selection through the fixed ratio, the operator operating the network should manually set the selection ratio. However, it may be difficult to manually set the selection ratio for the network structure which is becoming complex. In addition, the NF selection through the fixed ratio may be difficult to respond to changes in the network environment as the types of terminals and services increase and the pattern of traffic becomes complex. In addition, the NF selection through the fixed ratio has a problem that the ratio should be manually set, in case that a change (e.g., addition, deletion) of the NF within the core network 104 occurs. Therefore, for a complex network environment, a method of collecting data of NF (hereinafter, target NF) to be selected and automatically performing the NF selection based on the data is required.

The embodiment of the disclosure proposes an adaptive NF selection method for performing the load balancing based on various parameters of data collected from the target NF and dynamically reflecting the environment of the real-time network. The apparatus and method according to the embodiment of the disclosure may perform the NF selection by collecting data from the target NF and processing and analyzing the data using an artificial intelligence model (AI model). For example, the apparatus and method according to the embodiment of the disclosure may identify the load of the current target NF or the load of the future predicted target NF based on collected data. The apparatus and method according to the embodiment of the disclosure may reinforce the load balancing by performing the NF selection based on the identified result. Through the apparatus and method according to the embodiment of the disclosure, the operator may operate the network in accordance with the network environment by setting the parameters and setting the weight. Accordingly, the apparatus and method according to the embodiment of the disclosure may improve the quality of the network and may reduce operating costs, by performing load balancing between NFs.

Figure 4:
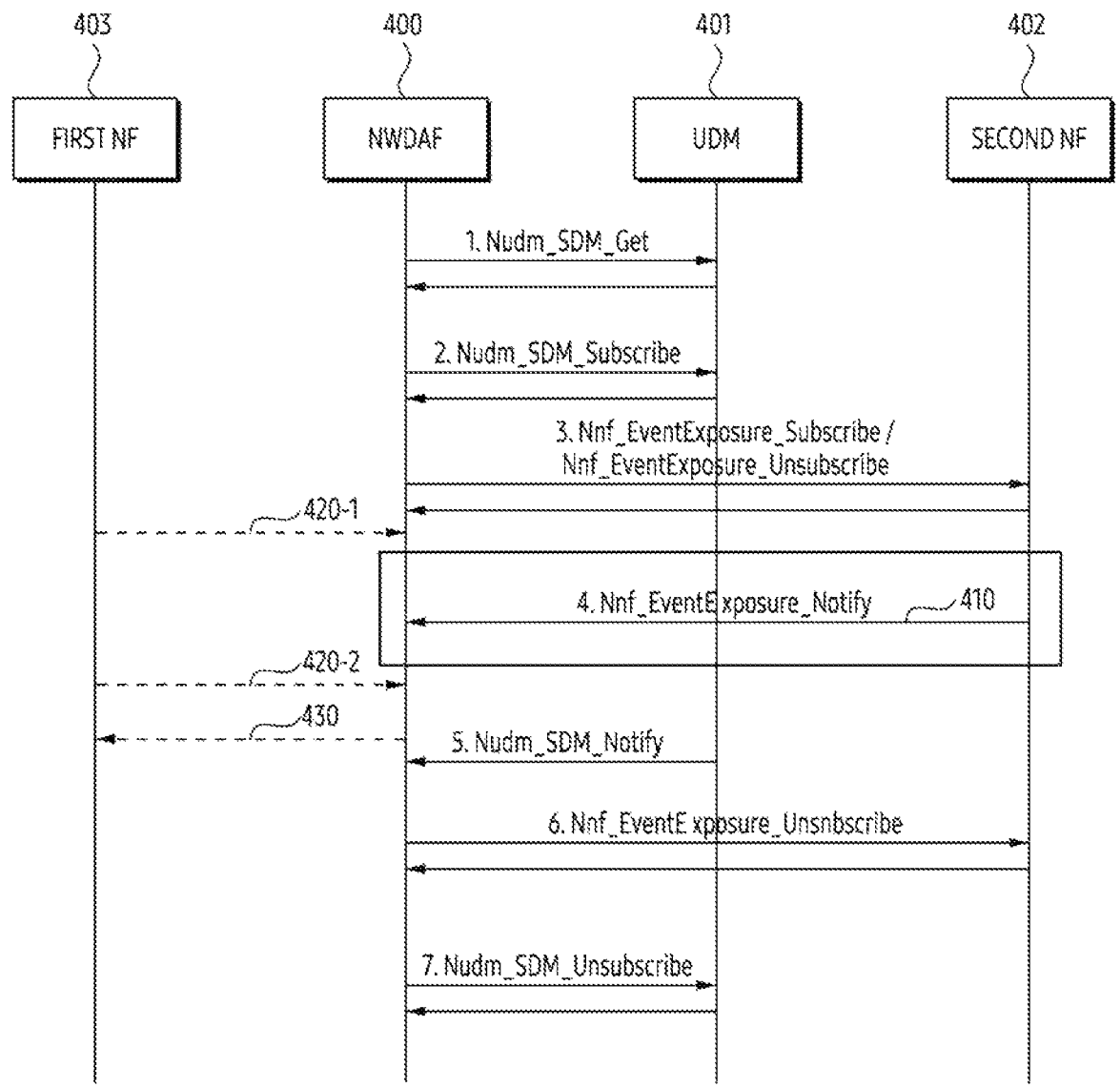
FIG. 4 illustrates an example of a method of collecting load information associated with a target NF.

FIG. 4 illustrates an example of a method of collecting load information associated with a target NF.

The target NF may be an NF to be selected based on the load information. Hereinafter, the target NF may be referred to as a 'second' NF 402. In addition, the NF, which selects the second NF 402 among multiple candidate NFs, based on the load information, may be referred to as a 'first' NF 403. For example, each of the NWDAF 400, the UDM 401, the second NF 402, and the first NF 403 (of FIG. 4) may be included in a core network entity 130 of FIG. 2C. The NWDAF 400 may correspond to the NWDAF 130i in FIG. 1. The UDM 401 may correspond to the UDM 350 in FIG. 3 and the UDM 130f in FIG. 1.

FIG. 4 illustrates an example of an operation of the NWDAF 400 collecting data from each of the second NFs (multiple candidate NFs). In FIG. 4, the NWDAF 400 is exemplified as an NF existing outside the first NF 403, but the embodiment of the disclosure is not limited thereto. For example, the NWDAF 400 (or a logical configuration that performs substantially the same function as the NWDAF 400) may be included in the first NF 403.

The operations of FIG. 4 may represent a procedure in which the NWDAF 400 subscribes/unsubscribes in the second NF 402 to inform data collection on relevant events by using event exposure services by the NWDAF 400. Collection of user consent data and use of the collected data for a user equipment (e.g., a terminal 120 of FIG. 1) based on local regulatory requirements may be required. For example, the user consent may be used for analytics operations or model training operations.

Referring to FIG. 4, the NWDAF 400 may perform a procedure for identifying whether the user consent is acquired, with the UDM 401. Based on the user consent, the NWDAF 400 may identify whether to subscribe to the second NF 402.

In case that the NWDAF 400 subscribes to the second NF 402 in relation to a specific event, the second NF 402 may transmit data on the second NF 402 to the NWDAF 400 together with a report on the specific event. For example, in operation 410, the second NF 402 may transmit the data to the NWDAF 400 through an 'Nnf_EventExposure_Notify' message. For example, the data may include load information of the second NF 402. The load information may include information identifying the load of the second NF 402. The information identifying the load may include parameters.

For example, the load information may include a factor associated with the service provided by the second NF 402, a user plane factor, and a control plane factor. For example, the parameters may include at least one of the factor associated with the service, the user plane factor, and the control plane factor.

For example, the factor associated with the service may include at least one of a number of user equipments associated with the second NF 402, a number of protocol data unit (PDU) sessions (or PDU session counts), or a number of quality of service (QoS) flows. For example, the number of user equipment associated with the second NF 402 may include the maximum number of user equipments in which the second NF 402 may service or the number of user equipments in which the second NF 402 provides services. For example, the number of the PDU sessions and the number of the QoS flows may represent the number of PDU sessions and QoS flows that the second NF 402 provides services. For example, the factor associated with the service may include at least one of information representing the load of central processing unit (CPU), a memory, or a disk of the second NF 402.

For example, the user plane factor may include at least one of a traffic, a packet drop rate, or an internet protocol (IP) pool (or an IP pool usage). For example, the traffic may include an amount of traffic used during a unit time and performance capacity information for maximum serviceable traffic. The packet drop rate may include a number and a size of packets dropped due to data transmission/reception failure. The packet drop rate may be referred to as a 'drop packet.' For example, the IP pool usage may include the number (or the usage) of IPs allocated to a specific user equipment within the IP pool.

For example, the control plane factor may include transaction per second (TPS) or information on call. The TPS may include a number of messages per unit time (second). The information on call may include information on an attempt, a success, a failure, and cause of failure according to the call procedure.

Parameters included in the load information may be identified based on the second NF 402. For example, the parameters may be identified based on a function or a role of the second NF 402.

For example, the NWDAF 400 may periodically obtain the load information from the second NF 402. For example, the NWDAF 400 may obtain the load information at every period of a designated length (e.g., 5 minutes). However, the embodiment of the disclosure is not limited thereto.

Referring to FIG. 4, in operation 420-1, the first NF 403 may transmit a request message for NF selection to the NWDAF 400. FIG. 4 illustrates that the operation 420-1 is performed immediately before the operation 410, but the embodiment of the disclosure is not limited thereto. For example, the operation 420-1 may be performed at any time instance before the operation 410 is performed. Alternatively, in operation 420-2, the first NF 403 may transmit the request message to the NWDAF 400. In other words, the first NF 403 may transmit the request message to the NWDAF 400 at a time before or after the NWDAF 400 obtains the load information from the second NF 402. Referring to operation 420-1, the NWDAF 400 may collect the load information based on the received request message. Referring to the operation 420-2, the NWDAF 400 may identify the collected load information based on the received request message.

Referring to operation 430, the NWDAF 400 may transmit a response message to the first NF 403 in response to the request message. The response message may include the load of the second NF 402 identified based on the load information. For example, the load of the second NF 402 may represent information for selecting the second NF 402 among the second NFs (multiples candidate NFs). Specific details associated with this are described in FIG. 8 below.

Referring to FIG. 4, the second NF 402 may be selected by the first NF 403. For example, the first NF 403 may include or correspond to AMF or SMF. For example, the second NF 402 may include or correspond to an SMF, UPF, UDM, or PCF. However, the embodiment of the disclosure is not limited by the above-described examples.

FIG. 4 illustrates that the NWDAF 400 collects data from one second NF 402, but the embodiment of the disclosure is not limited thereto. For example, the NWDAF 400 may collect the load information from each of the second NFs (multiple candidate NFs) including the second NF 402.

Figure 5A:
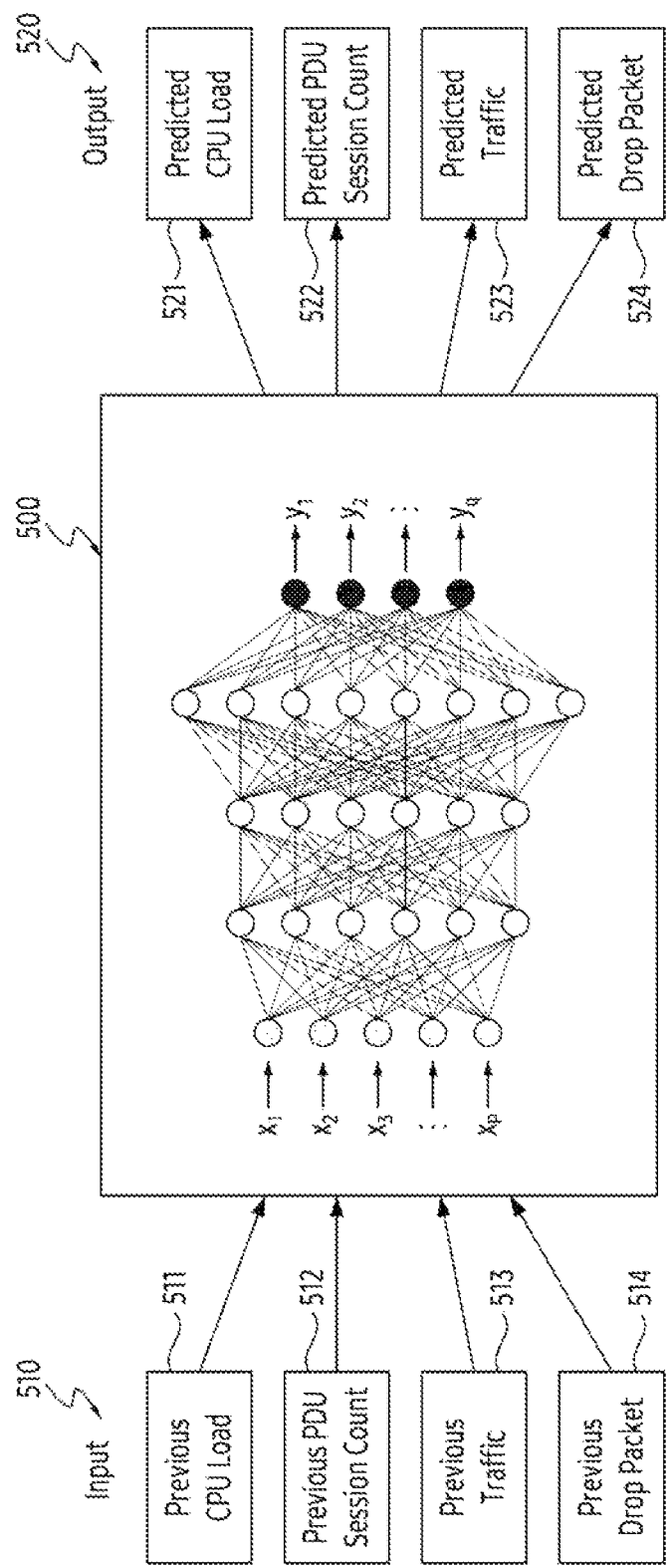
FIG. 5A illustrates an example of an artificial intelligence (AI) model that obtains predicted load information based on collected load information.

FIG. 5A illustrates an example of an artificial intelligence (AI) model that obtains predicted load information based on collected load information.

An AI model 500 of FIG. 5A may include a machine learning model configured with a stacked recurrent neural network (RNN) learning a sequential input 510, and a fully connected (FC) neural network for generating an output 520. For example, the RNN may include a gated recurrent unit (GRU) and a long short-term memory (LSTM). However, the embodiment of the disclosure is not limited thereto. The AI model 500 may be configured with another series of AI models.

The AI model 500 of FIG. 5A may be included in a NWDAF 400 of FIG. 4. For example, the NWDAF 400 may include the AI model 500 or a component that perform substantially the same function as the AI model 500. In addition, as described in FIG. 4, the NWDAF 400 may be included in a first NF 403, and the AI model 500 may be included in the first NF 403.

Referring to FIG. 5A, the AI model 500 may generate the output 520 based on the input 510. For example, the input 510 may include parameters of load information. For example, the load information may include load information obtained by the NWDAF 400 from the second NF 402 in FIG. 4. For example, the parameters may include parameters of the load information obtained by the NWDAF 400 from the second NF 402. For example, the input 510 may include a CPU load 511, a PDU session count 512, a traffic 513, and drop packets 514. The parameters included in the input 510 may represent parameters (i.e., previous parameters) collected in the past based on the current time instance. However, the embodiment of the disclosure is not limited thereto. For example, the input 510 may further include parameters other than the parameters of FIG. 5A or may include parameters excluding some of the parameters of FIG. 5A. The input 510 may be an input (x1, x2, . . . , xp) for the input layer of the AI model 500.

The AI model 500 may generate the output 520 based on the input 510. For example, the output 520 may include the parameters. The parameters included in the output 520 may correspond to the parameters included in the input 510. For example, the output 520 may include a CPU load 521, a PDU session count 522, a traffic 523, and drop packets 524. The parameters included in the output 520 may represent parameters (i.e., predicted parameters) to be collected in the future, based on the current time instance. However, the embodiment of the disclosure is not limited thereto. For example, the output 520 may further include other parameters other than the parameters of FIG. 5A or may include parameters excluding some of the parameters of FIG. 5A. The output 520 may be the output (y1, y2, . . . , yq) for the output layer of the AI model 500.

Referring to FIG. 5A, the AI model 500 may generate parameters corresponding to the parameters as output, based on the parameters included in the load information. The generated output may represent predicted (expected) parameters. In order to generate the predicted (estimated) parameters, the AI model 500 may be trained. An example of data for training the AI model 500 is described in detail in FIG. 5B below.

Figure 5B:
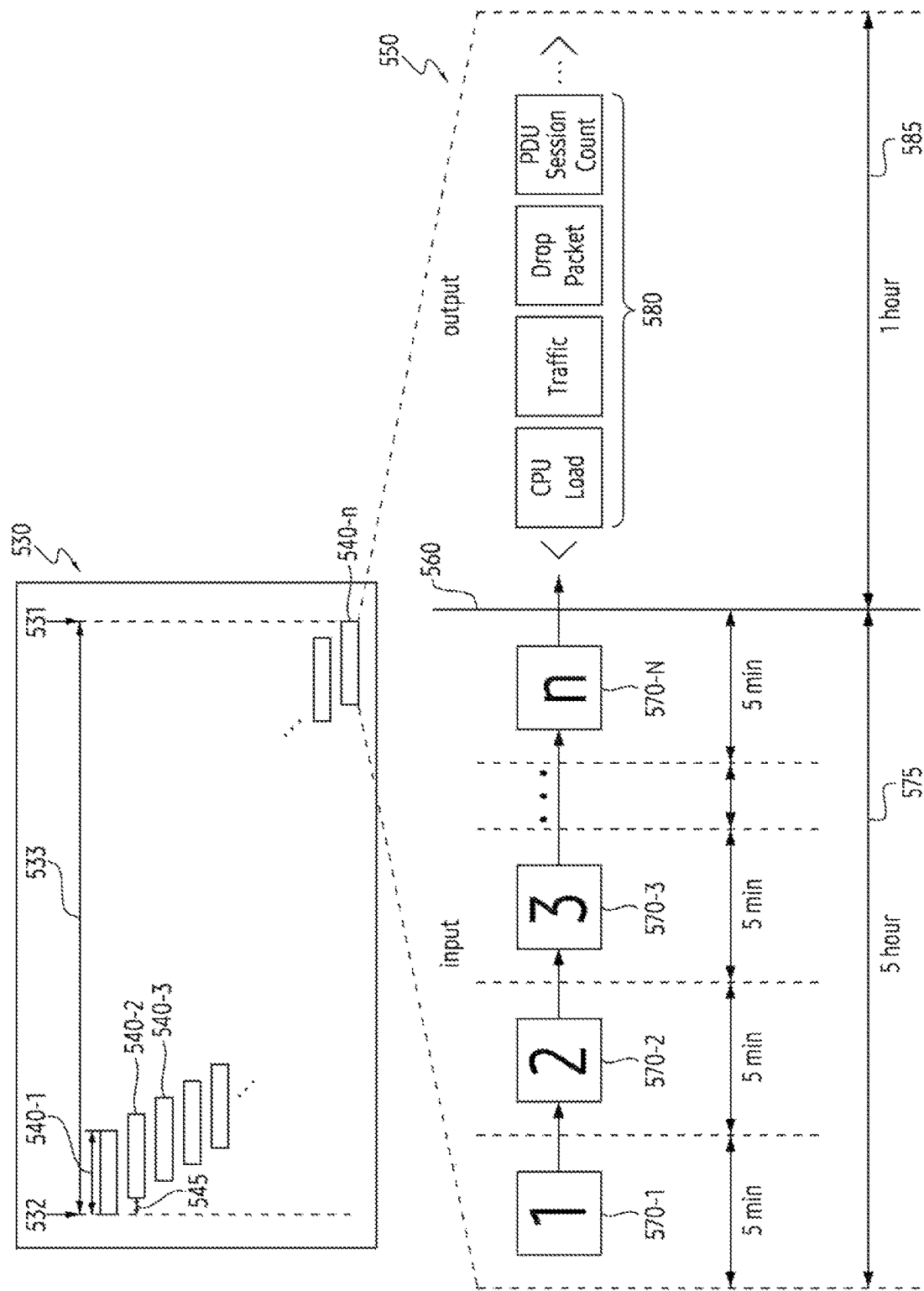
FIG. 5B illustrates an example of a method of training an AI model based on load information of time intervals.

FIG. 5B illustrates an example of a method of training an AI model based on load information of time intervals.

The load information may represent load information collected by a NWDAF 400 from a second NF 402, which is a target NF, in FIG. 4. The AI model, which is the training target of FIG. 5B, may correspond to the AI model 500 of FIG. 5A.

FIG. 5B illustrates an example 530 in which the NWDAF 400 collects the load information during a designated period 533. Referring to the example 530, the NWDAF 400 may collect the load information during a time interval from a current time instance 531 (or timing) to a past time instance 532 (or timing), which corresponds to the designated period 533. For example, the designated period 533 may be 3 months. For example, the time interval may be 5 minutes. The time interval may represent a period in which the load information is collected. Referring to the example 530, the current time instance 531 changes over time, and the designated period 533 has a specific length, so the past time instance 532 may change. The designated period 533 may represent the length of data stored in association with the second NF 402 by the NWDAF 400.

For example, the designated period 533 may be configured with a set of sequences including time intervals. For example, the set of sequences may include sequences 540-1, 540-2, 540-3, . . . , 540-n. For example, the temporal length of one sequence may be 6 hours. In other words, the one sequence may include 72 time intervals.

For example, the temporal difference between two adjacent sequences among the sequences 540-1, 540-2, 540-3, . . . , 540-n may be defined as one time interval. For example, the difference 545 between the sequence 540-1 and the sequence 540-2 may correspond to the length (e.g., 5 minutes) of the one time interval.

The AI model 500 may perform training for each sequence. For example, the AI model 500 may be trained based on one sequence 540-n. Referring to FIG. 5B, a detailed example 550 of the sequence 540-n is illustrated.

Referring to the example 550, the sequence 540-n may include time intervals 570-1, 570-2, 570-3, . . . , 570-n, and 580. For example, based on a first set of load information before the reference time instance 560 (or reference timing) among the time intervals 570-1, 570-2, 570-3, . . . , 570-n, and 580, the AI model 500 may predict load information after the reference time instance 560. In other words, the AI model 500 may identify the predicted load information. For example, the reference time instance 560 may represent a point which 5 hours past from the earliest time instance (or the earliest timing) in the sequence 540-n. For example, the first set of load information may represent load information corresponding to a first time region 575. For example, the temporal length of the first time region 575 may be 5 hours. For example, the first set of load information may include load information corresponding to the time intervals 570-1, 570-2, 570-3, . . . , 570-n.

The AI model 500 may compare the predicted load information and a second set of load information after the reference time instance 560. For example, the second set of load information may represent load information corresponding to a second time region 585. For example, the temporal length of the second time region 585 may be 1 hour. For example, the second set of load information may include load information corresponding to time intervals including load information 580. For example, parameters included in the second set of load information may include CPU load, traffic, drop packets, and PDU session count, as illustrated in FIG. 5B. As described above, the AI model 500 may be trained by comparing the predicted load information and the second set of load information.

Referring to FIG. 5B, the first portion among the sequences 540-1, 540-2, 540-3, . . . , 540-n within the designated period 533 may be used for training the AI model 500. In addition, a second portion different from the first portion among the sequences 540-1, 540-2, 540-3, . . . , 540-n within the designated period 533 may be used to evaluate the prediction accuracy (or accuracy) of the trained AI model 500. In other words, through the example 550 of FIG. 5B, training the AI model 500 may be performed based on each of the sequences of the first portion. The first portion and the second portion may not overlap each other. For example, a portion of the sequences 540-1, 540-2, 540-3, . . . , 540-n included in the first portion may be different from a portion of the sequences 540-1, 540-2, 540-3, . . . , 540-n included in the second portion. For example, the first portion may include 70% of the sequences 540-1, 540-2, 540-3, . . . , 540-n. The second portion may include 30% of the sequences 540-1, 540-2, 540-3, . . . , 540-n. However, the embodiment of the disclosure is not limited thereto, and a ratio between the first portion and the second portion may be changed. In addition, each of the first portion and the second portion may include any sequence of the sequences 540-1, 540-2, 540-3, . . . , 540-n. In other words, the sequences included in the first portion or the second portion may not be identified in a time-series manner, but may be identified randomly.

In FIG. 5B, the AI model 500 is described as an example of comparing between the load information (or the second set of load information) including the parameters and predicted load information, but the embodiment of the disclosure is not limited thereto. For example, the AI model 500 may be trained by comparing the scaled load value based on parameters of the load information and the scaled load value of the predicted load information, as described later.

For example, based on the first set of load information before the reference time instance 560 among the time intervals 570-1, 570-2, 570-3, . . . , 570-n, and 580, the AI model 500 may identify a first load value associated with time after the reference time instance 560. For example, the reference time instance 560 may represent the point which 5 hours past from the earliest time instance in the sequence 540-n. For example, the first set of load information may represent load information corresponding to the first time region 575. For example, the temporal length of the first time region 575 may be 5 hours. For example, the first set of load information may include the load information corresponding to the time intervals 570-1, 570-2, 570-3, . . . , 570-n. The first load value may represent the value associated with time after the predicted reference time instance 560, based on the first set of load information. The first load value may represent a scaled value based on parameters of the first set of load information and a ratio between the parameters. The AI model 500 may compare the first load value and a second load value identified, based on the second set of load information, after the reference time instance 560. For example, the second set of load information may represent load information corresponding to the second time region 585. For example, the temporal length of the second time region 585 may be 1 hour. For example, the second set of load information may include load information corresponding to time intervals including the load information 580. The second load value may represent a value scaled based on parameters of the load information corresponding to the time intervals including the load information 580 and the ratio between the parameters. As described above, the NWDAF 400 may train the AI model 500 by comparing the first load value and the second load value. The method of calculating the first load value and the second load value may be understood as substantially the same as the method of calculating the load weight of FIG. 6 below.

FIG. 5B illustrates that the NWDAF 400 includes one AI model 500, but the embodiment of the disclosure is not limited thereto. For example, the NWDAF 400 may include more AI models. For example, the NWDAF 400 may train each of the AI models based on load information obtained during the designated period 533. At this time, each of the AI models may be trained by varying a temporal condition or a location condition. For example, some of the AI models may be trained based on load information for the entire designated period 533. For example, some of the AI models may be trained based on training information for a specific day of the week within the designated period 533. For example, some of the remaining AI models may be trained based on training information for a specific time (e.g., 0 to 8 o'clock, 8 to 16 o'clock, or 16 to 24 o'clock) within the designated period 533. In an embodiment, AI models may be trained in consideration of the location condition (e.g., a service area).

In addition, the temporal length exemplified in FIG. 5B is an example, and the embodiment of the disclosure is not limited thereto. For example, the temporal length of the designated period 533 may have different lengths. For example, the temporal length of one sequence may have different lengths. For example, the temporal lengths of the first time region and the second time region within one sequence may have different lengths. For example, the temporal length of one time interval may have different lengths. In addition, the first portion and the second portion within the designated period 533 may be identified at different ratios.

Figure 6:
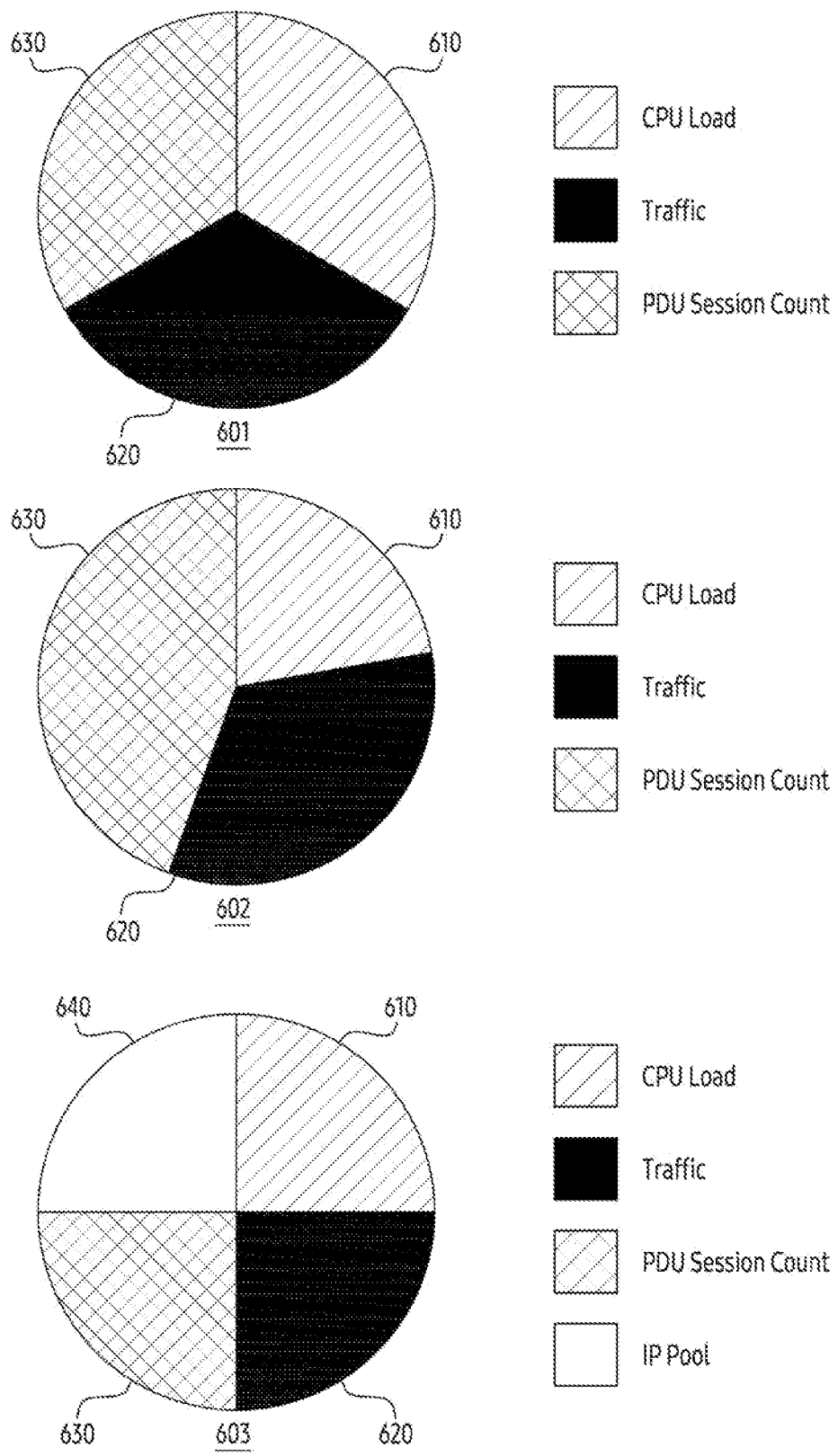
FIG. 6 illustrates examples of a method of identifying a load weight based on a ratio between parameters.

FIG. 6 illustrates examples of a method of identifying a load weight based on a ratio between parameters.

The parameters may represent parameters included in data (or load information) obtained by a NWDAF 400 from a second NF 402. The load information of FIG. 6 may represent load information for one time interval (e.g., a time interval 570-1 of FIG. 5B). In other words, the load information may represent data collected during one time interval.

The method of FIG. 6 may be performed by the NWDAF 400 of FIG. 4. In FIG. 6, an operation performed by the NWDAF 400 is described as an example, but the embodiment of the disclosure is not limited thereto. For example, it may be performed by a first NF 403 including the NWDAF 400.

FIG. 6 illustrates examples 601, 602, and 603 of identifying the load weight based on parameters included in the load information. For example, the parameters may include a CPU load 610, a traffic 620, a PDU session count 630, or an IP pool 640. The load weight may represent a summation of scaled values scored for each of the parameters and a value calculated based on a ratio between the parameters. Each of the scaled values may represent a number scaled to enable comparison between the parameters. For example, each of the scaled values may be a value between 0 and 100. For example, it is difficult to compare the size of the CPU load because the scaling is different from the PDU session count, each of the parameters may be converted into a scaled value.

Referring to example 601, the ratio between the parameters (the CPU load 610, the traffic 620, and the PDU session count 630) may be configured as 1:1:1. For example, the load weight may be identified based on a value that reflects each of the parameters (the CPU load 610, the traffic 620, and the PDU session count 630) at the same ratio. For example, assume that the scaled value of the CPU load 610 is 10, the scaled value of the traffic 620 is 20, and the scaled value of the PDU session count 630 is 30. The load weight of the example 601 may be 20(=10*1/3+20*1/3+30*1/3).

Referring to example 602, the ratio between the parameters (the CPU load 610, the traffic 620, and the PDU session count 630) may be configured as 2:3:4. For example, the load weight may be identified based on values that reflect each of the parameters (the CPU load 610, the traffic 620, and the PDU session count 630) at different ratios. For example, assume that the scaled value of the CPU load 610 is 10, the scaled value of the traffic 620 is 20, and the scaled value of the PDU session count 630 is 30. The load weight of the example 602 may be approximately 22.2(=10*2/9+20*3/9+30*4/9).

Referring to example 603, the ratio between the parameters (the CPU load 610, the traffic 620, the PDU session count 630, and the IP pool 640) may be configured as 1:1:1:1. For example, the load weight may be identified based on values that reflect each of the parameters (the CPU load 610, the traffic 620, the PDU session count 630, and the IP pool 640) at the same ratio. For example, it assumes the case that the scaled value of the CPU load 610 is 10, the scaled value of the traffic 620 is 20, the scaled value of the PDU session count 630 is 30, and the scaled value of the IP pool 640 is 40. The load weight of the example 603 may be 25 (=10*1/4+20*1/4+30*1/4+40*1/4).

Referring to the above, the NWDAF 400 may identify a load weight representing the load state of the NF (i.e., a target NF) associated with the load information, based on the obtained load information. For example, the NWDAF 400 may identify the current load state of the NF associated with the load information, based on the most recently collected load information. For example, the most recently collected load information may represent load information obtained during the current time instance 531 of FIG. 5B or the time interval closest to the current time instance 531. In a case that prediction accuracy of an AI model (e.g., an AI model 500) included in the NWDAF 400 is high, the load state of the NF may be identified by considering not only the most recently collected load information but also the predicted load information (or expected load information). In other words, more efficient load balancing may be performed by identifying the load state of the NF based on current load information and predicted load information and selecting one NF among NFs. A method of using predicted load information based on the prediction accuracy is described in detail in FIG. 7 below.

Figure 7:
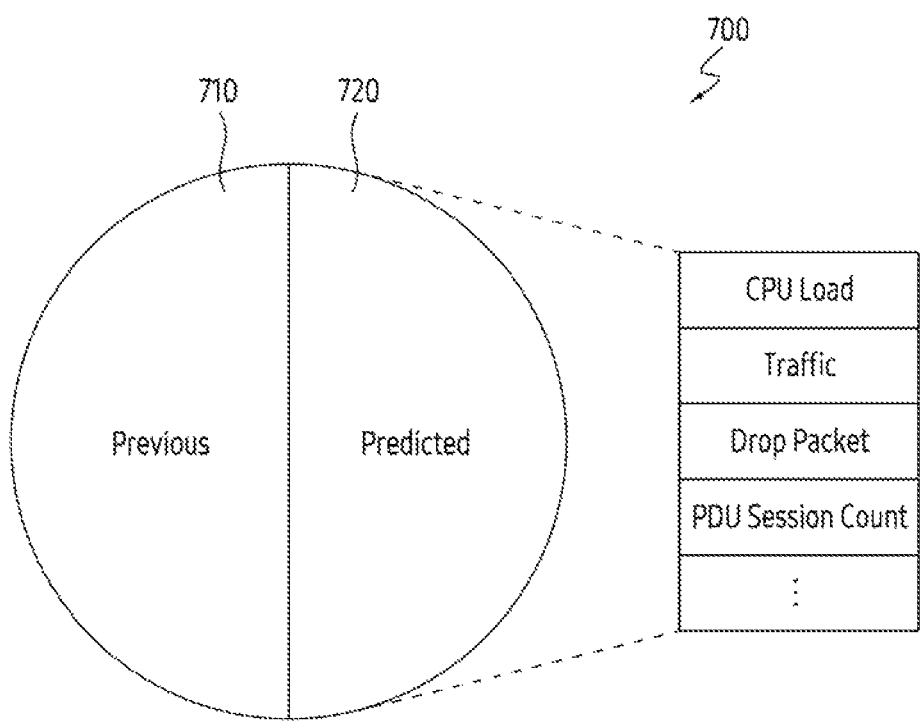
FIG. 7 illustrates an example of a method of identifying a load of each NF of NFs based on load information and predicted load information.

FIG. 7 illustrates an example of a method of identifying a load of each NF of NFs based on load information and predicted load information.

The load information may represent load information most recently collected by a NWDAF 400. For example, the most recently collected load information may represent load information obtained during a current time instance 531 of FIG. 5B or a time interval closest to the current time instance 531. For example, the one time interval may represent the last time interval included in the sequence 540-$n$ of FIG. 5B. The predicted load information may represent load information predicted by using an AI model 500 included in the NWDAF 400 based on the load information.

The method of FIG. 7 may be performed by the NWDAF 400 of FIG. 4. In FIG. 7, an operation performed by the NWDAF 400 is described as an example, but the embodiment of the disclosure is not limited thereto. For example, it may be performed by a first NF 403 including the NWDAF 400.

FIG. 7 illustrates an example 700 of identifying the load of the NF based on load information 710 and predicted load information 720 according to the prediction accuracy (or accuracy) of the AI model 500. For example, parameters included in each of the load information 710 and the predicted load information 720 may include CPU load, traffic, drop packets, and PDU session count.

Measuring the prediction accuracy of the AI model 500 may be performed based on load information collected during a designated period. FIG. 5B may be referenced regarding prediction accuracy.

Referring to FIG. 5B, the prediction accuracy may be identified based on a second portion different from a first portion used to train the AI model 500 among the load information collected during the designated period 533. For example, the AI model 500 may be trained based on the first portion among the load information collected during the designated period 533. The prediction accuracy of the trained AI model 500 may be identified based on the second portion. The second portion is information that has not been trained for the AI model 500, and may represent unknown load information.

For example, the NWDAF 400 may identify the prediction accuracy of the AI model 500 by using each of the sequences included in the second portion. For example, the NWDAF 400 may identify the prediction accuracy, based on the sequence 540-$n$ included in the second portion. For example, the AI model 500 may predict load information of a second time region 585, based on load information of a first time region 575 of the sequence 540-$n$. In case that the difference between the load information predicted based on the load information in the first time region 575 and the load information (actually obtained load information) of the second time region 585 is greater than or equal to the threshold value, the NWDAF 400 may identify that the prediction accuracy is low. On the other hand, in case that the difference is less than the threshold value, the NWDAF 400 may identify that the prediction accuracy is high. For example, the threshold value may be set based on a service to be provided by using NF, or a type of NF. The NF may be referred to as a target NF. For example, the NF may include a second NF 402 of FIG. 4. For example, in case that the service provided by the NF, or the type of NF is sensitive to load, the threshold value may be decreased. For example, the threshold value may be 10%. In addition, that the difference is 10% may be understood as that the prediction accuracy is 90%.

In the example, the AI model 500 has been described as an example of comparing the load information predicted based on the load information of the first time region 575 including the parameters and the load information of the second time region 585, but the embodiment of the disclosure is not limited thereto. For example, the NWDAF 400 may identify a first load value for after the reference time instance 560 based on the load information (a first set of load information) of the first time region 575 by using the AI model 500. In addition, the NWDAF 400 may identify a second load value based on the load information (a second set of load information) of the second time region 585. The NWDAF 400 may identify the prediction accuracy of the AI model 500 by comparing the first load value and the second load value. For example, it may be identified whether the difference between the first load value and the second load value is greater than or equal to the threshold value. The method of calculating the first load value and the second load value may be understood as substantially the same as the method of calculating the load weight of FIG. 6 below.

In addition, in the above example, an example of calculating the first load value and the second load value based on load information within one sequence 540-$n$ is described, but this is only exemplary, and the embodiment of the disclosure is not limited thereto. For example, the NWDAF 400 may identify the difference between the first load value and the second load value for each of the sequences included in the second portion within the designated period 533, and may compare the average value of the difference of the entire sequences with the threshold value.

For example, in case that the difference is greater than or equal to the threshold value, the prediction accuracy of the AI model 500 is inferior, so the NWDAF 400 may identify a load of each NF of NFs by using only the load information 710. The NFs may include target NFs. For example, the NFs may include the second NF 402 of FIG. 4. Identifying the load of each NF by using the load information 710 may include identifying the load weight described in FIG. 6.

For example, in case that the difference is less than the threshold value, the prediction accuracy of the AI model 500 is high, so the NWDAF 400 may identify the load of each NF of the NFs by using both the load information 710 and the predicted load information 720. Identifying the load of each NF by using the load information 710 and the predicted load information 720 may include identifying the load weight described in FIG. 6.

In identifying the load of each NF, the application ratio between the load information 710 and the predicted load information 720 used may be identified based on a magnitude of the difference. For example, the case that the application ratio is a value of 50% to 100% and the threshold value is 10% is assumed. For example, in case that the difference is 5%, the application ratio may be 75%. For example, in case that the difference is 0%, the application ratio may be 100%. The application ratio may represent the ratio at which the predicted load information 720 is used to identify the load of the NF. In other words, in case that the application ratio is 75%, the load information 710 may be used 25% and the predicted load information 720 may be used 75%.

Based on the application ratio, the load of each NF among the NFs may be identified. The load of each NF may be understood substantially the same as identifying the load weight of each NF. For example, regarding the NF associated with the load information 710 and the predicted load information 720 among the NFs, it is assumed that a load weight for the load information 710 is a first load weight, a load weight for the predicted load information 720 is a second load weight, and the application ratio is 75%. The load (or the load weight of the NF) of the NF may be identified based on the first load weight, the second load weight, and the application ratio. For example, the load of the NF may be identified as the first load weight*¼+the second load weight*¾. In the above example, an example of identifying the load for one NF among the NFs has been described, but the NWDAF 400 may identify the load for each of the NFs through the method described above.

In the example of FIG. 7, a case of identifying the prediction accuracy of one AI model 500 is described, but the embodiment of the disclosure is not limited thereto. As described in FIG. 5B, the NWDAF 400 may include AI models and may train the AI models. As described in FIG. 7, the NWDAF 400 may identify prediction accuracy for each of the AI models. The NWDAF 400 may identify an AI model with the highest prediction accuracy (i.e., the difference has the smallest value) among the AI models. The NWDAF 400 may identify the load (or load weight) for each of the NFs, by using the AI model with the highest prediction accuracy.

In addition, in case that the NWDAF 400 includes the AI models, based on the prediction accuracy, some AI models may not be used to identify the load (or load weight) for each of the NFs. For example, the NWDAF 400 may identify whether the prediction accuracy identified for each of the AI models is greater than or equal to a threshold value different from the threshold value. For example, in case that the prediction accuracy is greater than or equal to the other threshold value, the predicted load information of the AI model having the prediction accuracy may be corrected based on the predicted load information of other AI models, or may not be used as a value to identify the load. This is because parameters of load information for measuring the prediction accuracy generally increase or decrease linearly. Thus, in case of identifying predicted load information having values that has changed non-linearly (or rapidly) over time, the NWDAF 400 may identify it as a defect of the AI model. In identifying the load for the NFs, the NWDAF 400 may exclude the AI model in which the defect is identified.

Referring to the above, the apparatus and method according to an embodiment of the disclosure may predict data (predicted load information) based on data (load information) collected by using the AI model. The apparatus and method according to an embodiment of the disclosure may increase the accuracy of predicted load information and the stability of calculating predicted load information, by processing the collected data by using the AI model, processing data to be applied as input to the AI model, or using AI models.

Figure 8:
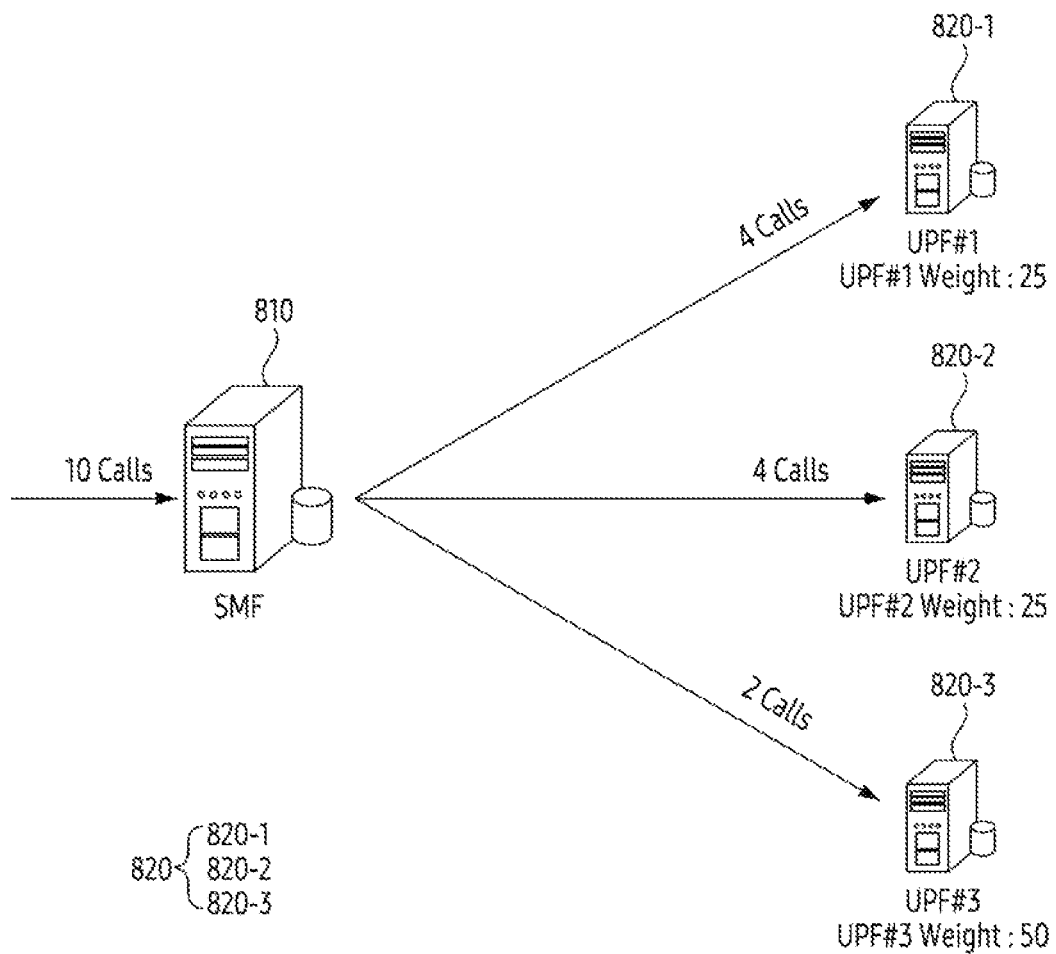
FIG. 8 illustrates an example of a method of selecting an NF from among NFs based on the load per NF.

FIG. 8 illustrates an example of a method of selecting an NF from among NFs based on the load per NF.

The load per NF may represent the load (or load weight) of each NF of NFs identified by a NWDAF 400. The NFs may include target NFs.

FIG. 8 illustrates an example of how a SMF 810 selects a UPF among UPFs 820, based on the load per NF identified by the NWDAF 400. The UPFs 820 may be referred to as one UPF group. For example, the SMF 810 may represent an example of a first NF 403 of FIG. 4. For example, each of the UPFs 820 may represent an example of a second NF 402 of FIG. 4. The method of FIG. 8 may be performed by the SMF 810, based on the load per NF obtained from NWDAF 400. The SMF 810 may correspond to the SMF 130b in FIG. 1. The UPFs 820 may correspond to the UPFs 330 in FIG. 3.

Referring to FIG. 8, the SMF 810 may identify that the number of newly introduced calls is ten (10). The SMF 810 may identify one UPF among the UPFs 820 for the ten (10) calls, based on the load per NF obtained from the NWDAF 400. For example, the load per NF may include a load weight of a first UPF 820-1, a load weight of a second UPF 820-2, and a load weight of a third UPF 820-3. For example, the load weight of the first UPF 820-1 may be 25. For example, the load weight of the second UPF 820-2 may be 25. For example, the load weight of the third UPF 820-3 may be 50.

The SMF 810 may identify the load capability of each UPF based on the load weights for the UPFs 820. The load capability may represent a value obtained by dividing a sum of load weights of the UPFs 820 by the load weight of the target UPF. For example, the load capability of the first UPF 820-1 may be 4 (=(25+25+50)/25). For example, the load capability of the second UPF 820-2 may be 4 (=(25+25+50)/25). For example, the load capability of the third UPF 820-3 may be 2 (=(25+25+50)/50). As the load capability increases, a smaller number of calls may be allocated. For example, the SMF 810 may allocate four calls among ten calls to the first UPF 820-1. For example, the SMF 810 may allocate four calls among ten calls to the second UPF 820-2. For example, the SMF 810 may allocate two calls among ten calls to the third UPF 820-3.

In the example of FIG. 8, a method of allocating a specific number of calls among 10 calls to a specific UPF is described as an example, but the embodiment of the disclosure is not limited thereto. For example, the SMF 810 may proportionally allocate calls to UPFs, based on a probability according to the load capability.

In the example of FIG. 8, a case, where 10 calls are generated at a time, is illustrated as an example, but the embodiment of the disclosure is not limited thereto. For example, in case that a call is generated or calls are generated sequentially, the SMF 810 may identify load capability based on load weights for the UPFs 820 and may select one UPF among the UPFs 820 based on the identified load capability. Alternatively, even in case that 10 calls occur at once, the SMF 810 may identify one UPF to be allocated to each of the 10 calls.

Referring to the above, in the apparatus and method according to an embodiment of the disclosure, the NF (e.g., the SMF 810) may select the target NF (e.g., the UPF) from among NFs connected to the NF, based on the load information. Accordingly, the apparatus and method according to an embodiment of the disclosure may perform load balancing for the NFs.

Figure 9:
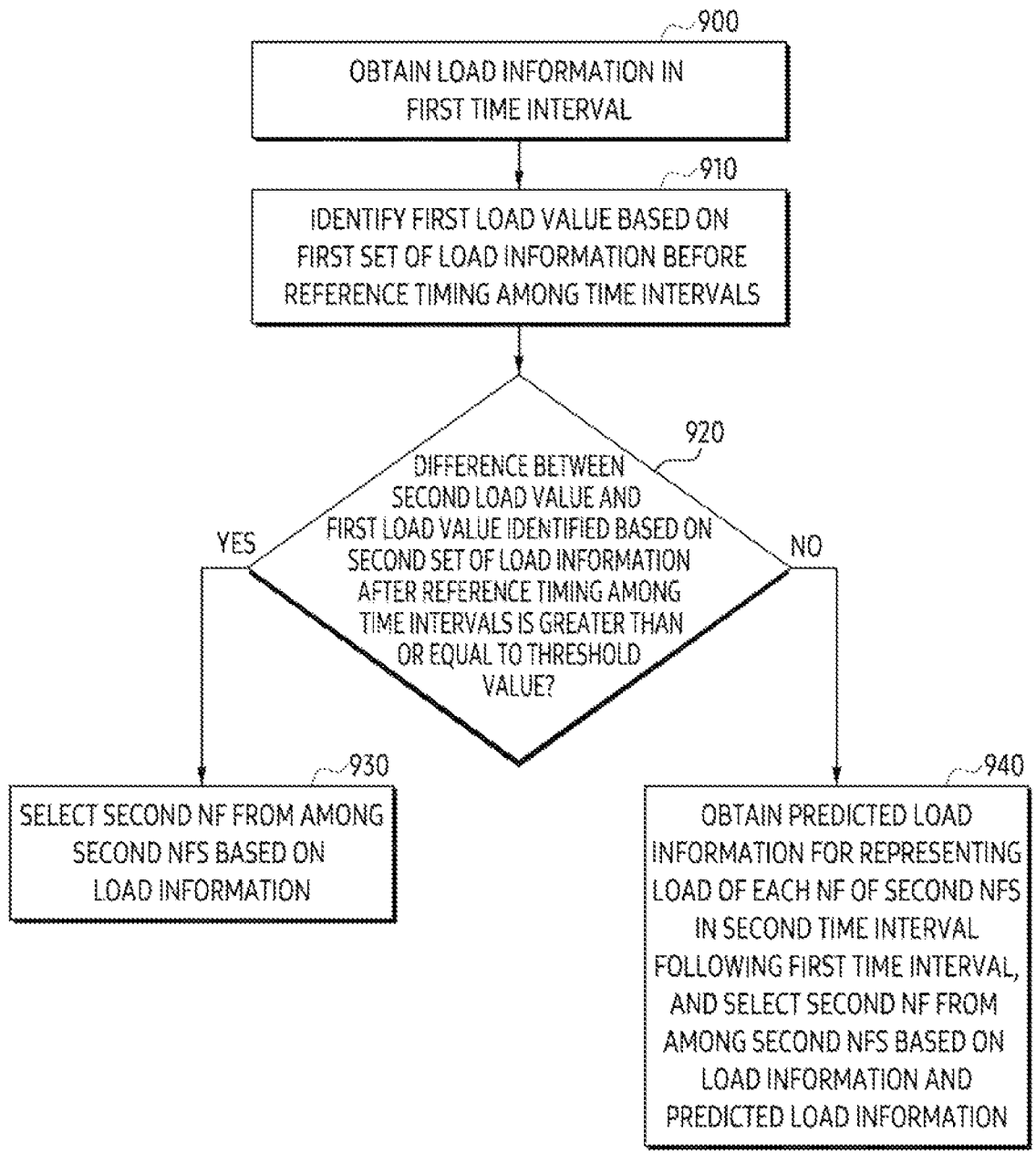
FIG. 9 illustrates an example of a motion flow for a method of performing NF selection based on prediction accuracy of an artificial intelligence model.

FIG. 9 illustrates a method of performing NF selection based on prediction accuracy of an AI model.

The method of FIG. 9 illustrates an operation performed by a first NF 403 including a NWDAF 400 of FIG. 4. In an embodiment, the first NF 403 may include an SMF or an AMF.

Referring to FIG. 9, in operation 900, the first NF 403 may obtain load information representing a load (a plurality of load values) of each of second NFs (candidate NFs) in a first time interval. For example, the first NF 403 may collect the load information from each of the second NFs. For example, the first time interval may include a time of a designated length from a current time instance (e.g., a current time instance 531 of FIG. 5B). For example, the load information for the first time interval may represent the most recently collected load information.

For example, the load information may represent the load (the plurality of load values) of each of the second NFs (candidate NFs). For example, each of the second NFs may represent an example of the second NF 402 of FIG. 4. For example, each of the second NFs may include a UPF or a SMF. The load information may include information for identifying the load of the second NF 402. The information for identifying the load may include parameters.

For example, the load information may include a factor associated with a service (or services) provided by the second NF 402, a user plane factor, and a control plane factor. For example, the parameters may include at least one of the factor associated with the service, the user plane factor, or the control plane factor.

For example, the factor associated with the service may include at least one of a number of user equipments associated with the second NF 402, a number of protocol data unit (PDU) sessions, or a number of quality of service (QoS) flows. For example, the number of user equipments associated with the second NF 402 may include a maximum number of user equipments in which the second NF 402 may service or a number of user equipments in which the second NF 402 provide a service (or services). For example, the number of the PDU sessions and the number of the QoS flows may represent the number of PDU sessions and QoS flows that the second NF 402 provides services. In addition, for example, the factor associated with the service may include at least one of information representing the load of central processing unit (CPU), memory, or the disk of the second NF 402.

For example, the user plane factor may include at least one of a traffic, a packet drop rate, or an internet protocol (IP) pool usage. For example, the traffic may include the amount of traffic used during a unit time and the performance capacity information for maximum serviceable traffic. The packet drop rate may include the number and size of packets dropped due to data transmission/reception failure. The packet drop rate may be referred to as a drop packet. For example, the IP pool usage may include the number (or usage) of IPs allocated to a specific terminal within the IP pool.

For example, the control plane factor may include transaction per second (TPS) or information on call. The TPS may include the number of messages per unit time (second). The information on call may include information on attempt, success, fail, and cause of failure according to the call procedure.

Parameters included in the load information may be identified based on the second NF 402. For example, the parameters may be identified based on the function or role of the second NF 402.

For example, the first NF 403 may periodically obtain the load information from the second NF 402. For example, the first NF 403 may obtain the load information every period of a designated length. For example, the designated length may be 5 minutes. However, the embodiment of the disclosure is not limited thereto.

In operation 910, the first NF 403 may identify a first load value based on a first set of load information before a reference time instance among time intervals. For example, the first NF 403 may identify the first load value based on the first set of load information before the reference time instance among the time intervals. For example, the first load value may be a value predicted (or estimated) by using the AI model (e.g., an AI model 500 of FIG. 5A) based on the first set of load information. For example, the time intervals may be 6 hours.

For example, the first NF 403 may identify the first set of load information before the reference time instance among the time intervals configuring one sequence. For example, the first NF 403 may identify the first load value, which is information predicted (estimated) for periods after the reference time instance, based on the first set of load information, by using the AI model (e.g., the AI model 500 of FIG. 5A) included in the first NF 403. For example, the first load value may represent a value identified based on load information predicted for after the reference time instance based on the first set of load information, which is the load information before the reference time instance. For example, the first load value may be calculated through substantially the same method as the method of calculating the load weight described in FIG. 6.

In operation 920, the first NF 403 may identify whether a difference between the second load value and the first load value identified based on a second set of load information after the reference time instance among the time intervals is greater than or equal to a threshold value. For example, the second load value may represent the value identified based on the second set of load information. For example, the second load value may be calculated through substantially the same method as the method of calculating the load weight described in FIG. 6.

For example, the first NF 403 may identify the prediction accuracy of the AI model included in the first NF 403, based on the difference between the first load value and the second load value. For example, in case that the difference is greater than or equal to the threshold value, the first NF 403 may identify that the prediction accuracy of the AI model is relatively low. For example, in case that the difference is less than the threshold value, the first NF 403 may identify that the prediction accuracy of the AI model is relatively high.

In the operation 920, in a case of identifying that the difference is greater than or equal to the threshold value, the first NF 403 may perform operation 930. In an embodiment, in the operation 920, in a case of identifying that the difference is less than the threshold value, the first NF 403 may perform operation 940.

In the operation 930, the first NF 403 may select a second NF from among the second NFs (the candidate NFs) based on the load information. For example, the first NF 403 may identify a first load weight based on the load information for the first time interval obtained in the operation 900. For example, the first load weight may be identified based on parameters included in the load information and a ratio between the parameters. For example, the first NF 403 may identify the first load weight for each of the second NFs. For example, the first NF 403 may identify the load capability for the second NFs, based on the first load weight for each of the second NFs. For example, the first NF 403 may select one second NF among the second NFs, based on the load capability for the second NFs.

In the operation 940, the first NF 403 may obtain predicted load information for representing the load of each NF of the second NFs in the second time interval following the first time interval, and may select the second NF from among the second NFs based on the load information and the predicted load information.

In an embodiment, the first NF 403 may obtain the predicted load information for the second time interval by using the AI model, based on the load information for the first time interval. In an embodiment, the first NF 403 may identify the first load weight based on the load information for the first time interval. For example, the second NF 402 may identify a second load weight based on the predicted load information. In an embodiment, the second load weight may be identified based on parameters included in the predicted load information and the ratio between the parameters.

For example, the first NF 403 may identify the application ratio between the load information and the predicted load information, based on the magnitude of the difference between the first load value and the second load value. For example, the case that the application ratio is 50% to 100%, and the threshold value is 10% is assumed. For example, in case that the difference is 5%, the application ratio may be 75%. For example, in case that the difference is 0%, the application ratio may be 100%. The application ratio may represent a ratio at which the predicted load information is used to identify the load of the second NF. In other words, in case that the application ratio is 75%, the load information may be used by 25%, and the predicted load information may be used by 75%.

For example, the first NF 403 may identify the load capability for the second NFs, based on the first load weight, the second load weight, and the application ratio for each of the second NFs. For example, the first NF 403 may select one second NF from among the second NFs, based on the load capability for the second NFs.

In FIG. 9, operations performed by the first NF 403 are described as examples, but the embodiment of the disclosure is not limited thereto. For example, the NWDAF 400 included in the first NF 403 may collect the load information, may process the collected load information, and may identify the load of the target NF (e.g., the second NFs) based on the processed load information. For example, as described in FIG. 4, in response to receiving a request message from the first NF 403, the NWDAF 400 may transmit a response message including information on the load of the target NF to the first NF 403.

Figure 10A:
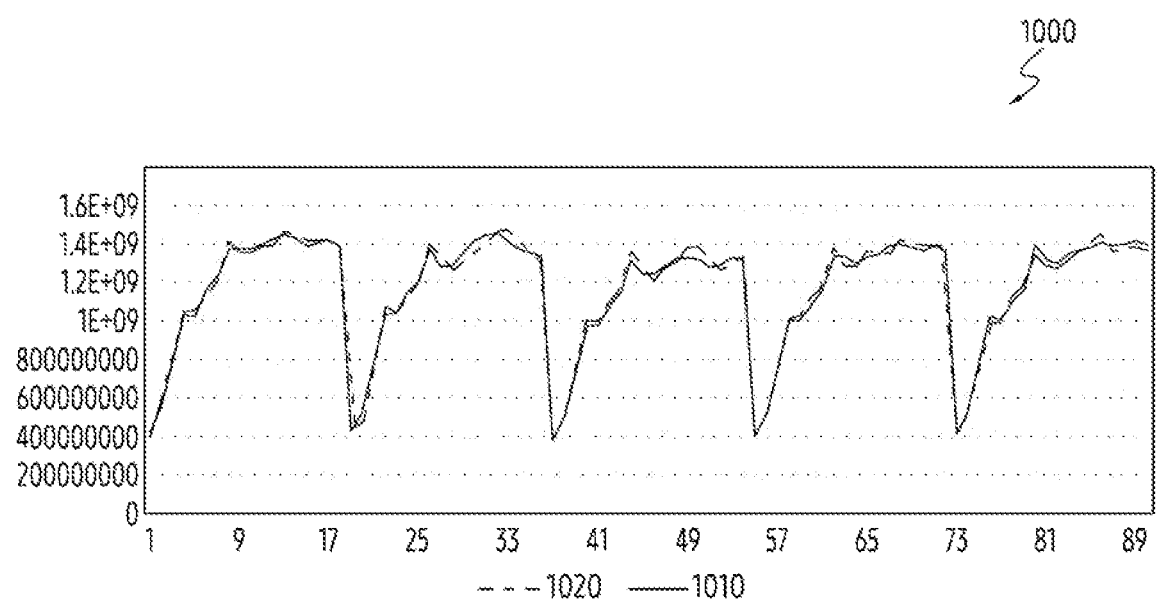
FIGS. 10A and 10B illustrate examples of graphs representing predicted load information and collected load information over time.
Figure 10B:
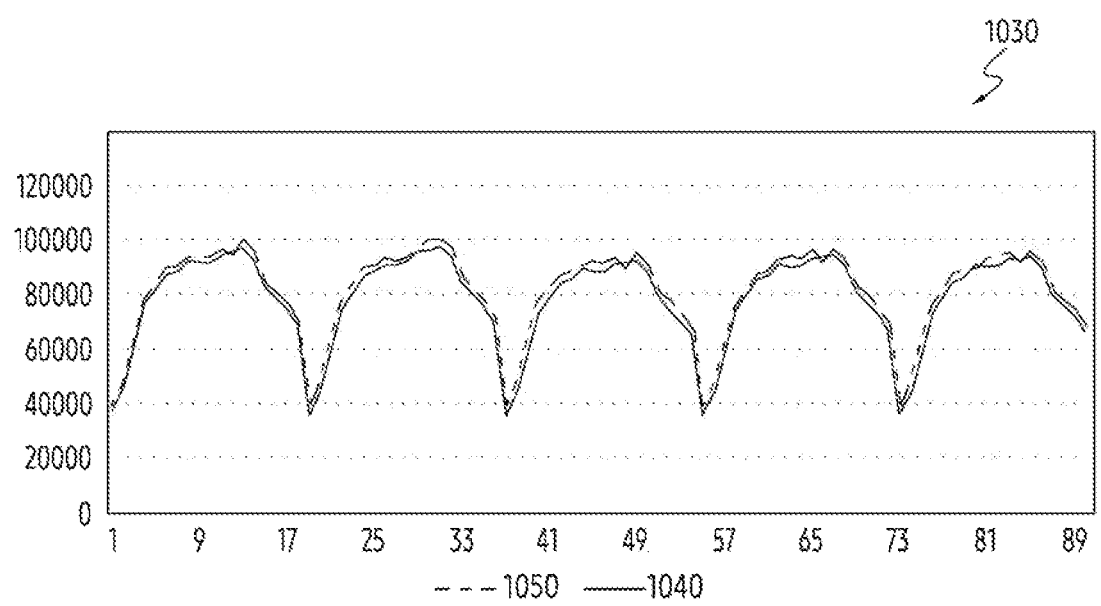

FIGS. 10A and 10B illustrate examples of graphs representing predicted load information and collected load information over time.

Each of the predicted load information and the collected load information may include parameters. For example, the parameters may include the number of traffic and PDU sessions.

FIG. 10A illustrates an example of a graph 1000 illustrating the number of traffic collected over time and the number of traffic predicted by using an AI model. The horizontal axis of the graph 1000 may represent time (unit: hour), and the vertical axis may represent the number of traffic. The graph 1000 may include a first line 1010 representing the number of traffic collected over time and a second line 1020 representing the number of predicted traffic. Comparing the first line 1010 and the second line 1020, the error rate between the collected traffic number of the first line 1010 and the predicted traffic number of the second line 1020 may be about 1.45%. For example, the error rate may be calculated based on a mean absolute percentage error (MAPE).

FIG. 10B illustrates an example of a graph 1030 illustrating the number of the PDU sessions collected over time and the number of the PDU sessions predicted by using the AI model. The horizontal axis of the graph 1030 may represent time (unit: hour), and the vertical axis may represent the number of the PDU sessions. The graph 1030 may include a first line 1040 representing the number of PDU sessions collected over time and a second line 1050 representing the number of predicted PDU sessions. Comparing the first line 1040 and the second line 1050, the error rate between the number of collected PDU sessions of the first line 1040 and the number of predicted PDU sessions of the second line 1050 may be about 1.68%. For example, the error rate may be calculated based on MAPE.

Referring to FIGS. 10A and 10B, the apparatus and method according to an embodiment of the disclosure may form a low error rate between load information collected during a designated period (e.g., 3 months) and load information predicted from the load information by using the AI model. Accordingly, the NF (e.g., a NWDAF 400 or a first NF 403) including the AI model may relatively accurately predict future load information based on load information collected currently or in the past. As described in FIGS. 10A and 10B, an example of performing load balancing by performing NF selection by using the AI model having the low error rate is described in detail in FIG. 10C below.

Figure 10C:
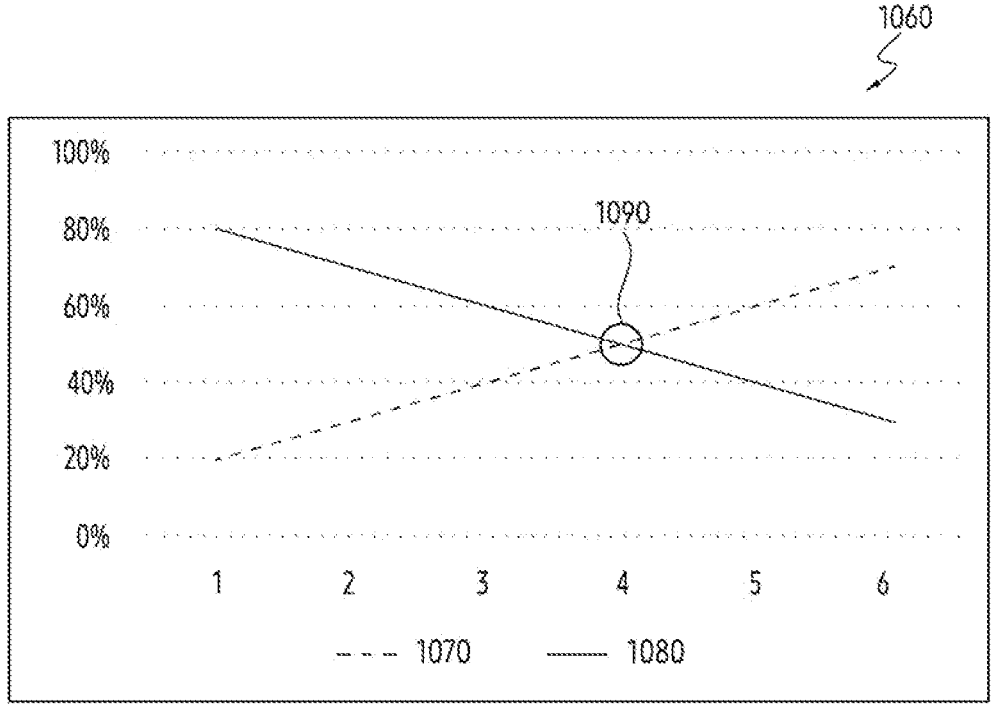
FIG. 10C illustrates an example of a graph representing loads of target NFs over time.

FIG. 10C illustrates an example of a graph representing loads of target NFs over time. The target NFs may include two UPFs. This is only illustrated as two UPFs, and the embodiment of the disclosure is not limited thereto. For example, the target NFs may include three or more UPFs.

FIG. 10C illustrates an example of a graph 1060 illustrating a ratio of loads between two UPFs over time. The horizontal axis of the graph 1060 represents time (unit: hour), and the vertical axis represents the ratio (unit: percent) of the load allocated to the two UPFs.

The graph 1060 may include a first line 1070 representing the ratio of the load to the first UPF and a second line 1080 representing the ratio of the load to the second UPF. Referring to the first line 1070 and the second line 1080, a ratio of a load occupied by the first qUPF among the two UPFs may gradually increase over time, and a ratio of a load occupied by the second UPF may gradually decrease. For example, at the current time instance 1090, the ratio of the load each occupied by the first UPF and the second UPF may be the same ratio (i.e., 50%).

The apparatus and method according to an embodiment of the disclosure may predict future load information by using an AI model, based on load information collected at the current time instance 1090 and the time instance before the current time instance 1090. For example, the apparatus and method according to an embodiment of the disclosure may predict the load of NFs based on the collected load information, not the load information to be collected, and select a specific NF among the NFs based on the predicted load. Accordingly, the apparatus and method according to an embodiment of the disclosure may perform preemptive load balancing.

In addition, the apparatus and method according to an embodiment of the disclosure may perform NF selection more precisely by differently setting parameters for identifying the load of NFs according to the network environment of the communication system. For example, in the increasingly segmented and complex network environment of the 5G communication system, the configuration of NFs included in the network may become complicated. For example, a network environment in which two UPFs form one group is being changed to include three or more UPFs. Accordingly, the NF selection may be effectively performed, by setting parameters for identifying loads on the three or more UPFs by using the apparatus and method according to an embodiment of the disclosure.

In addition, the apparatus and method according to an embodiment of the disclosure may perform dynamic operation based on the AI model, rather than being manually managed by the operator who operates the network environment, which is segmented and complicated as described above. For example, the apparatus and method according to an embodiment of the disclosure may identify the load of each target NF by considering the changing network environment, by analyzing data (or the load information) collected in real time or during a short time interval. By using the apparatus and method according to an embodiment of the disclosure, the operator may efficiently operate the network, may minimize resource use, and may reduce costs used for network management.

In embodiments, a method performed by a first network function (NF) may comprise obtaining load information for representing a load of each NF of second NFs in a first time interval. The method may comprise identifying a first load value based on a first set of load information before a reference time instance from among time intervals. The method may comprise identifying whether a difference between the first load value and a second load value that is identified based on a second set of load information after the reference time instance from among the time intervals is greater than or equal to a threshold value. The method may comprise selecting a second NF from among the second NFs based on the load information in case that the difference is greater than or equal to the threshold value. The method may comprise obtaining predicted load information for representing a load of each NF of the second NFs in a second time interval after the first time interval in case that the difference is less than the threshold value. The method may comprise selecting the second NF from among the second NFs based on the load information and the predicted load information. The predicted load information is obtained by using an AI model (AI model) based on the load information.

According to one embodiment, the method may comprise identifying an applying ratio between the load information and the predicted load information based on a magnitude of the difference less than the threshold value. The method may comprise identifying a load of each NF of the second NFs based on the load information, the predicted load information, and the applying ratio.

According to one embodiment, the method may comprise in case that the difference less than the threshold value has a first value, identifying the applying ratio as a first ratio value. The method may comprise in case that the difference less than the threshold value has a second value less than the first value, identifying the applying ratio as a second ratio value greater than the first ratio value. The method may comprise wherein the applying ratio is a ratio of the predicted load information used to identify a load of each NF of the second NFs.

According to one embodiment, the method may comprise identifying a first load weight based on first parameters included in the load information and a ratio among the first parameters and identifying a second load weight based on second parameters included in the predicted load information and a ratio among the second parameters. The method may comprise wherein a load of each NF of the second NFs is identified based on the first load weight, the second load weight, and the applying ratio.

According to one embodiment, the first parameters or the second parameters may include at least one of a factor associated with a service provided by each of the second NFs, a user plane factor, or a control plane factor. The factor associated with the service may include a number of user equipment associated with each of second NFs, a number of protocol data unit (PDU) sessions, or a number of quality of service (QoS) flow, and information representing a load of disk, memory, or central processing unit (CPU) of each of the second NFs.

According to one embodiment, the user plane factor may include traffic, packet drop rate, or internet protocol (IP) pool usage. The control plane factor may include transaction per second (TPS), or information for a call, According to one embodiment, the AI model may include recurrent neural network (RNN). The AI model may be trained based on a first portion of load information during a designated duration. The first set of load information and the second set of load information associated with the time intervals may be included in a second portion different from the first portion from among the load information during the designated duration.

According to one embodiment, the AI model may be included in AI models. Each of AI models may be trained based on the first portion. The AI model may be a model in which the difference has a minimum value from among the AI models.

According to one embodiment, the first NF may comprise a session management function (SMF). The second NFs may comprise user plane functions (UPFs).

According to one embodiment, the first load value may be an expected value by using the AI model based on the first set of load information.

In embodiments, a device of first network function (NF) may comprise a transceiver. The device may comprise a processor operatively coupled to the transceiver. The processor may be configured to obtain load information for representing a load of each NF of second NFs in a first time interval. The processor may be configured to identify a first load value based on a first set of load information before a reference time instance from among time intervals. The processor may be configured to identify whether a difference between the first load value and a second load value that is identified based on a second set of load information after the reference time instance from among the time intervals is greater than or equal to a threshold value. The processor may be configured to select a second NF from among the second NFs based on the load information in case that the difference is greater than or equal to the threshold value. The processor may be configured to obtain predicted load information for representing a load of each NF of the second NFs in a second time interval after the first time interval in case that the difference is less than the threshold value. The processor may be configured to select the second NF from among the second NFs based on the load information and the predicted load information. The predicted load information may be obtained by using an AI model based on the load information.

According to one embodiment, the processor may be configured to identify an applying ratio between the load information and the predicted load information based on a magnitude of the difference less than the threshold value. The processor may be configured to identify a load of each NF of the second NFs based on the load information, the predicted load information, and the applying ratio.

According to one embodiment, the processor may be configured to, in case that the difference less than the threshold value has a first value, identify the applying ratio as a first ratio value. The processor may be configured to, in case that the difference less than the threshold value has a second value less than the first value, identify the applying ratio as a second ratio value greater than the first ratio value. The applying ratio may be a ratio of the predicted load information used to identify a load of each NF of the second NFs.

According to one embodiment, the processor may be configured to identify a first load weight based on first parameters included in the load information and a ratio among the first parameters. The processor may be configured to identify a second load weight based on second parameters included in the predicted load information and a ratio among the second parameters. A load of each NF of the second NFs may be identified based on the first load weight, the second load weight, and the applying ratio.

According to one embodiment, the first parameters or the second parameters may include at least one of a factor associated with a service provided by each of the second NFs, a user plane factor, or a control plane factor. The factor associated with the service may include a number of user equipment associated with each of second NFs, a number of protocol data unit (PDU) sessions, or a number of quality of service (QoS) flow, and information representing a load of disk, memory, or central processing unit (CPU) of each of the second NFs.

According to one embodiment, the user plane factor may include traffic, packet drop rate, or internet protocol (IP) pool usage. The control plane factor may include transaction per second (TPS), or information for a call, According to one embodiment, the AI model may include recurrent neural network (RNN). The AI model may be trained based on a first portion of load information during a designated duration. The first set of load information and the second set of load information associated with the time intervals may be included in a second portion different from the first portion from among the load information during the designated duration.

According to one embodiment, the AI model may be included in AI models. Each of AI models may be trained based on the first portion. The AI model may be a model in which the difference has a minimum value from among the AI models.

According to one embodiment, the first NF may comprise a session management function (SMF). The second NFs may comprise user plane functions (UPFs).

In embodiments, a method performed by a network data analytics function (NWDAF) may comprise receiving, from a first network function (NF), a request message for selection a second NF from among second NFs. The method may comprise obtaining load information for representing a load of each NF of the second NFs in a first time interval. The method may comprise identifying a first load value based on a first set of load information before a reference time instance from among time intervals. The method may comprise identifying whether a difference between the first load value and a second load value that is identified based on a second set of load information after the reference time instance from among the time intervals is greater than or equal to a threshold value. The method may comprise generating a response message including the load information in case that the difference is greater than or equal to the threshold value. The method may comprise generating the response message including the load information and predicted load information for representing a load of each NF of the second NFs in a second time interval after the first time interval in case that the difference is less than the threshold value. The method may comprise transmitting, to the first NF, the response message. The predicted load information may be obtained by using an AI model based on the load information.

In embodiments, a device of a network data analytics function (NWDAF) may comprise a transceiver. The device may comprise a processor operatively coupled to the transceiver. The processor may be configured to receive, from a first network function (NF), a request message for selection a second NF from among second NFs. The processor may be configured to obtain load information for representing a load of each NF of the second NFs in a first time interval. The processor may be configured to identify a first load value based on a first set of load information before a reference time instance from among time intervals. The processor may be configured to identify whether a difference between the first load value and a second load value that is identified based on a second set of load information after the reference time instance from among the time intervals is greater than or equal to a threshold value. The processor may be configured to generate a response message including the load information in case that the difference is greater than or equal to the threshold value. The processor may be configured to generate the response message including the load information and predicted load information for representing a load of each NF of the second NFs in a second time interval after the first time interval in case that the difference is less than the threshold value. The processor may be configured to transmit, to the first NF, the response message. The predicted load information may be obtained by using an AI model based on the load information.

In embodiments, an electronic device for a session management function (SMF) may comprise memory storing instructions. The electronic device may comprise at least one processor. The instructions may cause, when executed by the at least one processor, the electronic device to obtain a first load value for a second time interval before selecting a serving user plane function (UPF), estimated based on an artificial intelligence model (AI model) using first load information of each of UPFs measured within a first time interval before the second time interval. The instructions may cause, when executed by the at least one processor, the electronic device to obtain a second load value for the second time interval, calculated by using second load information of each of the UPFs measured within the second time interval. The instructions may cause, when executed by the at least one processor, the electronic device to determine a difference between the first load value for the second time interval and the second load value for the second time interval. The instructions may cause, when executed by the at least one processor, the electronic device to determine, using the difference, whether to use a predicted load value of each of the UPFs obtained based on the AI model to select the serving UPF from among the UPFs.

According to one embodiment, the instructions may cause, when executed by the at least one processor, the electronic device, in case that the difference is greater than a threshold, to select the serving UPF from among the UPFs in accordance with an allocated load value of each of the UPFs. The instructions may cause, when executed by the at least one processor, the electronic device, in case that the difference is smaller than the threshold, to obtain the predicated load value of each of the UPFs, based on the AI model using the allocated load value of each of the UPFs, and to select the serving UPF from among the UPFs in accordance with the predicated load value of each of the UPFs and the allocated load value of each of the UPFs.

According to one embodiment, the instructions may cause, when executed by the at least one processor, the electronic device to obtain a first weight and a second weight according to the difference. The instructions may cause, when executed by the at least one processor, the electronic device to obtain a load factor of each of the UPFs by applying the first weight to the predicated load value of each of the UPFs and applying the second weight to the allocated load value of each of the UPFs. The instructions may cause, when executed by the at least one processor, the electronic device to select the serving UPF, in accordance with a magnitude of the load factor of each of the UPFs.

According to one embodiment, the first weight may be inversely proportional to a magnitude of the difference. The second weight may be proportional to the magnitude of the difference.

According to one embodiment, the threshold may be determined based on a service type of a call processed by the serving UPF.

According to one embodiment, the allocated load value of each of the UPFs may be calculated based on load information of each of the UPFs. The load information of each of the UPFs may include at least one of a factor associated with a service provided by each of the UPFs, a user plane factor, or a control plane factor. The factor associated with the service may include at least one of a number of user equipments (UEs) associated with each of the UPFs, a number of protocol data unit (PDU) sessions, a number of quality of service (QoS) flows, or information representing a load of disk, memory, or central processing unit (CPU) of each of the UPFs. The user plane factor may include at least one of traffic, packet drop rate, or internet protocol (IP) pool usage. The control plane factor may include at least one of transaction per second (TPS), or information for a call.

According to one embodiment, the load information of each of the UPFs may include the number of UEs, the number of PDU sessions, and the number of QoS flows. The allocated load value of each of the UPFs may be calculated based on a first factor scaled from the number of UEs, a second factor scaled from the number of PDU sessions, a third factor scaled from the number of QoS flows, and a ratio among the first factor, the second factor, and the third factor.

According to one embodiment, the instructions may cause, when executed by the at least one processor, the electronic device to obtain load information of each of the UPFs during a designated duration including the first time interval and the second time interval. The instructions may cause, when executed by the at least one processor, the electronic device to perform a training of the AI model for a machine learning with at least a portion of the load information of each of the UPFs.

According to one embodiment, the allocated load value of each of the UPFs may be calculated for a period having a predetermined length before selecting the serving UPF. The predicted load value of each of the UPFs may be estimated for a period having the predetermined length after selecting the serving UPF.

In embodiments, a method performed by an electronic device for a session management function (SMF), may comprise obtaining a first load value for a second time interval before selecting a serving UPF, estimated based on an artificial intelligence model (AI model) using first load value information of each of UPFs measured within a first time interval before the second time interval. The method may comprise obtaining a second load value for the second time interval, calculated by using second load value information of each of the UPFs measured within the second time interval. The method may comprise determining a difference between the first load value for the second time interval and the second load value for the second time interval. The method may comprise determining, using the difference, whether to use a predicted load value of each of the UPFs obtained based on the AI model to select the serving UPF from among the UPFs.

According to one embodiment, the method may comprise, in case that the difference is greater than a threshold, selecting the serving UPF from among the UPFs in accordance with an allocated load value of each of the UPFs. The method may comprise, in case that the difference is smaller than the threshold, obtaining the predicated load value of each of the UPFs, based on the AI model using the allocated load value of each of the UPFs, and selecting the serving UPF from among the UPFs in accordance with the predicated load value of each of the UPFs and the allocated load value of each of the UPFs.

According to one embodiment, the method may comprise obtaining a first weight and a second weight according to the difference. The method may comprise obtaining a load factor of each of the UPFs by applying the first weight to the predicated load value of each of the UPFs and applying the second weight to the allocated load value of each of the UPFs. The method may comprise selecting the serving UPF, in accordance with a magnitude of the load factor of each of the UPFs.

According to one embodiment, the first weight may be inversely proportional to a magnitude of the difference. The second weight may be proportional to the magnitude of the difference.

According to one embodiment, the threshold may be determined based on a service type of a call processed by the serving UPF.

According to one embodiment, the allocated load value of each of the UPFs may be calculated based on load information of each of the UPFs. The load information of each of the UPFs may include at least one of a factor associated with a service provided by each of the UPFs, a user plane factor, or a control plane factor. The factor associated with the service may include at least one of a number of user equipments (UEs) associated with each of the UPFs, a number of protocol data unit (PDU) sessions, a number of quality of service (QoS) flows, or information representing a load of disk, memory, or central processing unit (CPU) of each of the UPFs. The user plane factor may include at least one of traffic, packet drop rate, or internet protocol (IP) pool usage. The control plane factor may include at least one of transaction per second (TPS), or information for a call.

According to one embodiment, the load information of each of the UPFs may include the number of UEs, the number of PDU sessions, and the number of QoS flows. The allocated load value of each of the UPFs may be calculated based on a first factor scaled from the number of UEs, a second factor scaled from the number of PDU sessions, a third factor scaled from the number of QoS flows, and a ratio among the first factor, the second factor, and the third factor.

According to one embodiment, the method may comprise obtaining load information of each of the UPFs during a designated duration including the first time interval and the second time interval. The method may comprise performing a training of the AI model for a machine learning with at least a portion of the load information of each of the UPFs.

According to one embodiment, the allocated load value of each of the UPFs may be measured for a period having a predetermined length before selecting the serving UPF. The predicted load value of each of the UPFs may be estimated for a period having the predetermined length after selecting the serving UPF.

In embodiments, a computer-readable storage medium may include instructions. The instructions may cause, when executed by at least one processor of an electronic device for a session management function (SMF), the electronic device to obtain a first load value for a second time interval before selecting a serving UPF, predicated based on an artificial intelligence model (AI model) using first load value information of each of UPFs measured within a first time interval before the second time interval. The instructions may cause, when executed by the at least one processor, the electronic device to obtain a second load value for the second time interval, calculated by using second load value information of each of the UPFs measured within the second time interval. The instructions may cause, when executed by the at least one processor, the electronic device to determine a difference between the first load value for the second time interval and the second load value for the second time interval. The instructions may cause, when executed by the at least one processor, the electronic device to determine, using the difference, whether to use a predicated load value of each of the UPFs obtained based on the AI model to select the serving UPF from among the UPFs.

According to one embodiment, the instructions may cause, when executed by the at least one processor, the electronic device to, in case that the difference is greater than a threshold, select the serving UPF from among the UPFs in accordance with an allocated load value of each of the UPFs. The instructions may cause, when executed by the at least one processor, the electronic device to, in case that the difference is smaller than the threshold, obtain the predicated load value of each of the UPFs, based on the AI model using the allocated load value of each of the UPFs, and select the serving UPF from among the UPFs in accordance with the predicated load value of each of the UPFs and the allocated load value of each of the UPFs.

Methods according to the embodiments described in the claims or the specification of the disclosure may be implemented in the form of hardware, software, or a combination of hardware and software.

In case of implemented as software, a computer-readable storage medium storing one or more program (software module) may be provided. The one or more program stored in the computer-readable storage medium is configured for execution by one or more processor in the electronic device. The one or more program include instructions that cause the electronic device to execute methods according to embodiments described in the claim or the specification of the disclosure.

Such program (software modules, software) may be stored in random access memory, non-volatile memory including flash memory, read only memory (ROM), electrically erasable programmable read only memory (EEPROM), magnetic disc storage device, compact disc-ROM (CD-ROM), digital versatile disc (DVD) or other form of optical storage, magnetic cassette. Alternatively, it may be stored in a memory configured with some or all combinations thereof. In addition, each configuration memory may be included a plurality.

In addition, the program may be stored in an attachable storage device that may be accessed through a communication network, such as the Internet, Intranet, local area network (LAN), wide area network (WAN), or storage area network (SAN), or a combination thereof. Such a storage device may be connected to a device performing an embodiment of the disclosure through an external port. In addition, a separate storage device on the communication network may access a device performing an embodiment of the disclosure.

In the above-described specific embodiments of the disclosure, the component included in the disclosure is expressed in singular or plural according to the presented specific embodiment. However, singular or plural expression is chosen appropriately for the situation presented, and the disclosure is not limited to singular or plural component, and even if the component is expressed in plural, it may be configured with singular, or even if it is expressed in singular, it may be configured with plural.

In the detailed description of the disclosure, the specific embodiment have been described, but it goes without saying that various modification is possible within the limit not departing from the scope of the disclosure.

What is claimed is:

1. An electronic device for a session management function (SMF) comprising:
memory storing instructions; and
at least one processor,
wherein the instructions, when executed by the at least one processor, cause the electronic device to:
obtain a first load value for a second time interval before selecting a serving user plane function (UPF), estimated based on an artificial intelligence model (AI model) using first load information of each of UPFs measured within a first time interval before the second time interval;
obtain a second load value for the second time interval, calculated by using second load information of each of the UPFs measured within the second time interval;
determine a difference between the first load value for the second time interval and the second load value for the second time interval; and
determine, using the difference, whether to use a predicted load value of each of the UPFs obtained based on the AI model to select the serving UPF from among the UPFs.

2. The electronic device of claim 1, wherein the instructions, when executed by the at least one processor, cause the electronic device to:
in case that the difference is greater than a threshold, select the serving UPF from among the UPFs in accordance with an allocated load value of each of the UPFs; and in case that the difference is smaller than the threshold:
obtain the predicted load value of each of the UPFs, based on the AI model using the allocated load value of each of the UPFs, and
select the serving UPF from among the UPFs in accordance with the predicted load value of each of the UPFs and the allocated load value of each of the UPFs.

3. The electronic device of claim 2, wherein the instructions, when executed by the at least one processor, cause the electronic device to:
obtain a first weight and a second weight according to the difference;
obtain a load factor of each of the UPFs by applying the first weight to the predicted load value of each of the UPFs and applying the second weight to the allocated load value of each of the UPFs; and
select the serving UPF, in accordance with a magnitude of the load factor of each of the UPFs.

4. The electronic device of claim 3, wherein the first weight is inversely proportional to a magnitude of the difference, and
wherein the second weight is proportional to the magnitude of the difference.

5. The electronic device of claim 2, wherein the threshold is determined based on a service type of a call processed by the serving UPF.

6. The electronic device of claim 2, wherein the allocated load value of each of the UPFs is calculated based on load information of each of the UPFs,
wherein the load information of each of the UPFs includes at least one of a factor associated with a service provided by each of the UPFs, a user plane factor, or a control plane factor,
wherein the factor associated with the service includes at least one of a number of user equipments (UEs) associated with each of the UPFs, a number of protocol data unit (PDU) sessions, a number of quality of service (QOS) flows, or information representing a load of disk, memory, or central processing unit (CPU) of each of the UPFs,
wherein the user plane factor includes at least one of traffic, packet drop rate, or internet protocol (IP) pool usage, and
wherein the control plane factor includes at least one of transaction per second (TPS), or information for a call.

7. The electronic device of claim 6, wherein the load information of each of the UPFs includes the number of UEs, the number of PDU sessions, and the number of QoS flows, and
wherein the allocated load value of each of the UPFs is calculated based on a first factor scaled from the number of UEs, a second factor scaled from the number of PDU sessions, a third factor scaled from the number of QoS flows, and a ratio among the first factor, the second factor, and the third factor.

8. The electronic device of claim 1, wherein the instructions, when executed by the at least one processor, cause the electronic device to:
obtain load information of each of the UPFs during a designated duration including the first time interval and the second time interval; and
perform a training of the AI model for a machine learning with at least a portion of the load information of each of the UPFs.

9. The electronic device of claim 2, wherein the allocated load value of each of the UPFs is calculated for a period having a predetermined length before selecting the serving UPF, and
wherein the predicted load value of each of the UPFs is estimated for a period having the predetermined length after selecting the serving UPF.

10. A method performed by an electronic device for a session management function (SMF), comprising:
obtaining a first load value for a second time interval before selecting a serving user plane function (UPF), estimated based on an artificial intelligence model (AI model) using first load information of each of UPFs measured within a first time interval before the second time interval;
obtaining a second load value for the second time interval, calculated by using second load information of each of the UPFs measured within the second time interval;
determining a difference between the first load value for the second time interval and the second load value for the second time interval; and
determining, using the difference, whether to use a predicted load value of each of the UPFs obtained based on the AI model to select the serving UPF from among the UPFs.

11. The method of claim 10, the method comprising:
in case that the difference is greater than a threshold, selecting the serving UPF from among the UPFs in accordance with an allocated load value of each of the UPFs; and
in case that the difference is smaller than the threshold:
obtaining the predicted load value of each of the UPFs, based on the AI model using the allocated load value of each of the UPFs, and
selecting the serving UPF from among the UPFs in accordance with the predicted load value of each of the UPFs and the allocated load value of each of the UPFs.

12. The method of claim 11, the method comprising:
obtaining a first weight and a second weight according to the difference;
obtaining a load factor of each of the UPFs by applying the first weight to the predicted load value of each of the UPFs and applying the second weight to the allocated load value of each of the UPFs; and
selecting the serving UPF, in accordance with a magnitude of the load factor of each of the UPFs.

13. The method of claim 12, wherein the first weight is inversely proportional to a magnitude of the difference, and
wherein the second weight is proportional to the magnitude of the difference.

14. The method of claim 11, wherein the threshold is determined based on a service type of a call processed by the serving UPF.

15. The method of claim 11, wherein the allocated load value of each of the UPFs is calculated based on load information of each of the UPFs,
wherein the load information of each of the UPFs includes at least one of a factor associated with a service provided by each of the UPFs, a user plane factor, or a control plane factor, wherein the factor associated with the service includes at least one of a number of user equipments (UEs) associated with each of the UPFs, a number of protocol data unit (PDU) sessions, a number of quality of service (QOS) flows, or information representing a load of disk, memory, or central processing unit (CPU) of each of the UPFs, wherein the user plane factor includes at least one of traffic, packet drop rate, or internet protocol (IP) pool usage, and wherein the control plane factor includes at least one of transaction per second (TPS), or information for a call.

16. The method of claim 15, wherein the load information of each of the UPFs includes the number of UEs, the number of PDU sessions, and the number of QoS flows, and wherein the allocated load value of each of the UPFs is calculated based on a first factor scaled from the number of UEs, a second factor scaled from the number of PDU sessions, a third factor scaled from the number of QoS flows, and a ratio among the first factor, the second factor, and the third factor.

17. The method of claim 10, the method comprising:
obtaining load information of each of the UPFs during a designated duration including the first time interval and the second time interval; and
performing a training of the AI model for a machine learning with at least a portion of the load information of each of the UPFs.

18. The method of claim 11, wherein the allocated load value of each of the UPFs is calculated for a period having a predetermined length before selecting the serving UPF, and wherein the predicted load value of each of the UPFs is estimated for a period having the predetermined length after selecting the serving UPF.

19. A non-transitory computer-readable storage medium including instructions,
wherein the instructions, when executed by at least one processor of an electronic device for a session management function (SMF), cause the electronic device to:
obtain a first load value for a second time interval before selecting a serving user plane function (UPF), estimated based on an artificial intelligence model (AI model) using first load information of each of UPFs measured within a first time interval before the second time interval;
obtain a second load value for the second time interval, calculated by using second load information of each of the UPFs measured within the second time interval;
determine a difference between the first load value for the second time interval and the second load value for the second time interval; and
determine, using the difference, whether to use a predicted load value of each of the UPFs obtained based on the AI model to select the serving UPF from among the UPFs.

20. The non-transitory computer-readable storage medium of claim 19, wherein the instructions, when executed by the at least one processor, cause the electronic device to:
in case that the difference is greater than a threshold, select the serving UPF from among the UPFs in accordance with an allocated load value of each of the UPFs; and
in case that the difference is smaller than the threshold:
obtain the predicted load value of each of the UPFs, based on the AI model using the allocated load value of each of the UPFs, and
select the serving UPF from among the UPFs in accordance with the predicted load value of each of the UPFs and the allocated load value of each of the UPFs.

* * * * *